(12) United States Patent
Clerc et al.

(10) Patent No.: US 9,052,918 B2
(45) Date of Patent: Jun. 9, 2015

(54) MANAGEMENT OF MULTIPLE SOFTWARE IMAGES WITH SHARED MEMORY BLOCKS

(75) Inventors: David Clerc, Verbier (CH); Jacques Fontignie, Onex (CH); Luis Garcés-Erice, Zurich (CH); Claudio Marinelli, Latina (IT); John G. Rooney, Zurich (CH); Marc V. Stückelberg, Cartigny (CH)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 13/325,310

(22) Filed: Dec. 14, 2011

(65) Prior Publication Data

US 2012/0151202 A1 Jun. 14, 2012

(30) Foreign Application Priority Data

Dec. 14, 2010 (EP) ..................................... 10194864

(51) Int. Cl.
*G06F 12/02* (2006.01)
*G06F 9/44* (2006.01)
*G06F 9/445* (2006.01)

(52) U.S. Cl.
CPC ................ *G06F 9/441* (2013.01); *G06F 12/02* (2013.01); *G06F 8/63* (2013.01)
USPC ....................................................... 711/165

(58) Field of Classification Search
CPC ...... G06F 12/02; G06F 12/0246; G06F 9/441
See application file for complete search history.

(56) References Cited

U.S. PATENT DOCUMENTS

| | | | |
|---|---|---|---|
| 6,098,158 A | 8/2000 | Lay et al. | |
| 6,567,774 B1 | 5/2003 | Lee et al. | |
| 6,857,069 B1 | 2/2005 | Rissmeyer et al. | |
| 6,920,555 B1 | 7/2005 | Peters et al. | |
| 6,925,533 B2 | 8/2005 | Lewis | |

(Continued)

FOREIGN PATENT DOCUMENTS

| | | |
|---|---|---|
| CA | 2817109 A1 | 6/2012 |
| CN | 101256527 A | 9/2008 |

(Continued)

OTHER PUBLICATIONS

Chinese Office Action for Chinese Application Serial No. 201110370120.7; Mailed May 13, 2014; 6 pages.

(Continued)

*Primary Examiner* — Hiep Nguyen
(74) *Attorney, Agent, or Firm* — Cantor Colburn LLP

(57) ABSTRACT

A data processing entity that includes a mass memory with a plurality of memory locations for storing memory blocks. Each of a plurality of software images includes a plurality of memory blocks with corresponding image addresses within the software image. The memory blocks of software images stored in boot locations of a current software image are relocated. The boot blocks of the current software image are stored into the corresponding boot locations. The data processing entity is booted from the boot blocks of the current software image in the corresponding boot locations, thereby loading the access function. Each request to access a selected memory block of the current software image is served by the access function, with the access function accessing the selected memory block in the associated memory location provided by the control structure.

20 Claims, 14 Drawing Sheets

(56) References Cited

U.S. PATENT DOCUMENTS

| | | | |
|---|---|---|---|
| 6,973,447 B1* | 12/2005 | Aguilar et al. | 713/2 |
| 7,062,517 B2 | 6/2006 | Kodama | |
| 7,103,747 B2 | 9/2006 | Wilson et al. | |
| 7,269,722 B1 | 9/2007 | Neary | |
| 7,360,072 B1 | 4/2008 | Soltis et al. | |
| 7,379,982 B2 | 5/2008 | Tabbara | |
| 7,428,636 B1 | 9/2008 | Waldspurger et al. | |
| 7,490,197 B2 | 2/2009 | Kirshenbaum et al. | |
| 7,509,530 B2 | 3/2009 | Welts | |
| 7,512,833 B1 | 3/2009 | Murphy et al. | |
| 7,614,050 B2 | 11/2009 | Sasaki et al. | |
| 7,653,794 B2 | 1/2010 | Michael et al. | |
| 7,664,834 B2 | 2/2010 | Keith, Jr. | |
| 7,809,919 B2 | 10/2010 | Thompson | |
| 8,112,505 B1 | 2/2012 | Ben-Shaul et al. | |
| 8,230,095 B2 | 7/2012 | Tsui et al. | |
| 8,510,352 B2* | 8/2013 | Mehra et al. | 707/831 |
| 8,527,728 B2* | 9/2013 | Clerc et al. | 711/165 |
| 2002/0073201 A1 | 6/2002 | French et al. | |
| 2003/0126242 A1 | 7/2003 | Chang | |
| 2003/0191623 A1 | 10/2003 | Salmonsen | |
| 2003/0225986 A1 | 12/2003 | Teshima | |
| 2004/0010708 A1 | 1/2004 | Johnson et al. | |
| 2004/0010787 A1 | 1/2004 | Traut et al. | |
| 2004/0030822 A1 | 2/2004 | Rajan et al. | |
| 2004/0088367 A1 | 5/2004 | Reinke | |
| 2004/0268345 A1 | 12/2004 | Lodwick et al. | |
| 2005/0160150 A1 | 7/2005 | Kao | |
| 2006/0031547 A1 | 2/2006 | Tsui et al. | |
| 2006/0080385 A1 | 4/2006 | Blandford et al. | |
| 2007/0220494 A1 | 9/2007 | Spooner | |
| 2008/0010639 A1 | 1/2008 | Bestmann | |
| 2008/0027950 A1 | 1/2008 | Fukumi | |
| 2008/0040714 A1 | 2/2008 | Wheeler et al. | |
| 2008/0133208 A1 | 6/2008 | Stringham | |
| 2008/0141015 A1 | 6/2008 | Chalemin et al. | |
| 2008/0155245 A1 | 6/2008 | Lipscombe et al. | |
| 2008/0256219 A1 | 10/2008 | Zhang et al. | |
| 2008/0301425 A1 | 12/2008 | Mittapalli et al. | |
| 2009/0037649 A1 | 2/2009 | Xu | |
| 2009/0049160 A1 | 2/2009 | Cherian et al. | |
| 2009/0193245 A1 | 7/2009 | Isaacson | |
| 2009/0240953 A1 | 9/2009 | Paul | |
| 2010/0037235 A1 | 2/2010 | Larimore et al. | |
| 2010/0138827 A1 | 6/2010 | Frank et al. | |
| 2010/0174894 A1 | 7/2010 | Chen et al. | |
| 2010/0205594 A1 | 8/2010 | Jirka | |
| 2011/0219372 A1 | 9/2011 | Agrawal et al. | |
| 2011/0231844 A1 | 9/2011 | Ben-Shaul et al. | |
| 2011/0264776 A1 | 10/2011 | Clerc et al. | |
| 2012/0151202 A1 | 6/2012 | Clerc et al. | |
| 2012/0311564 A1 | 12/2012 | Khalid | |
| 2013/0024680 A1 | 1/2013 | Heidingsfeld et al. | |
| 2013/0179856 A1 | 7/2013 | Lam | |
| 2013/0219161 A1 | 8/2013 | Fontignie et al. | |
| 2013/0232329 A1 | 9/2013 | Marinelli et al. | |
| 2013/0247020 A1 | 9/2013 | Fontignie et al. | |

FOREIGN PATENT DOCUMENTS

| | | | |
|---|---|---|---|
| CN | 102567042 A | 7/2012 | |
| CN | 102591675 A | 7/2012 | |
| CN | 103221921 A | 7/2013 | |
| CN | 103250134 A | 8/2013 | |
| CN | 103250163 A | 8/2013 | |
| DE | 11201103880 T5 | 8/2013 | |
| DE | 112011104325 T5 | 9/2013 | |
| DE | 112011104356 B4 | 5/2014 | |
| EP | 0770950 A2 | 5/1997 | |
| GB | 2499956 A | 9/2013 | |
| GB | 2499964 B | 12/2013 | |
| GB | 2499963 B | 3/2014 | |
| JP | 2008003815 A | 1/2008 | |
| JP | 2012128839 A | 7/2012 | |
| JP | 2012128841 A | 7/2012 | |
| JP | 2013543192 A | 11/2013 | |
| JP | 2013545204 A | 12/2013 | |
| JP | 2014505286 A | 2/2014 | |
| SG | 158757 A1 | 2/2010 | |
| WO | 02091099 A2 | 11/2002 | |
| WO | 2008049008 A2 | 4/2008 | |
| WO | 2008115012 A1 | 9/2008 | |
| WO | 2012069297 A1 | 5/2012 | |
| WO | 2012076266 A1 | 6/2012 | |
| WO | 2012079864 A1 | 6/2012 | |

OTHER PUBLICATIONS

Black, "Streaming Execution Mode," Application Streaming with VMware® ThinApp™, 2011, Information Guide, VMware, Inc., 8 pages.

Clerc et al., "Deploying an operating system," Filed on Apr. 27, 2010, p. 1-26, E.P. Patent Application No. 10425138.4, 26 pages.

Clerc et al., "Management of Multiple Software Images With Relocation of Boot Blocks,"0 Filed on Dec. 14, 2010, p. 1-49, E.P. Patent Application No. 10194866.9, 49 pages.

Clerc et al., "Management of Multiple Software Images With Shared Memory Blocks," Filed on Dec. 14, 2010, p. 1-49, E.P. Patent Application No. 10194864.4, 49 pages.

EDP Weekly, "SANRAD and emBoot team to deliver iSCSI diskless boot," EDP Weekly's IT Monitor, Jul. 18, 2005, Millin Publishing, Inc., Gale Group, http://www.thefreelibrary.com/_/print/PrintArticle.aspx?id=134957464, Accessed on: Apr. 22, 2010, 2 pages.

Etherboot.Org, "Etherboot/gPXE Wiki," The Etherboot Project Community, Last modified: Mar. 26, 2011, http://etherboot.org/wiki/index.php, Accessed on: Oct. 3, 2014, 4 pages.

Fegreus, "Real Magic with Virtual Snapshots," Open Mag, Mar. 3, 2008, http://www.open-mag.com/100348.shtml, Accessed on: Apr. 22, 2010, 1 page.

Fontignie et al., "Direct Migration of Software Images With Steaming Technique," Filed on Nov. 23, 2010, p. 1-38, E.P. Patent Application No. 10192219.3, 38 pages.

Fontignie et al., "Computer-readable storage mediums for encrypting and decrypting a virtual disc," Filed on Dec. 9, 2010, p. 1-41, E.P. Patent Application No. 101944001, 41 pages.

Fontignie et al., "Upgrade of Software Images Based on Streaming Techniqhe," Filed on Dec. 13, 2010, p. 1-39, E.P. Patent Application No. 101947091, 39 pages.

Fontignie et al., "Computer-Readable Storage Mediums for Encrypting and Decrypting a Virtual Disc," Filed on Nov. 3, 2011, p. 1-41, I.N. Patent Application No. 4481/CHENP/2013, 41 pages.

Fontignie et al., "Upgrade of Software Images Based on Streaming Technique," Filed on May 24, 2013, p. 1-42, U.S. Appl. No. 13/989,673, 42 pages.

Fontignie et al., "Encrypting and Decrypting a Virtual Disc," filed Sep. 8, 2014, p. 1-28, U.S. Appl. No. 14/479,475, 28 pages.

Fontignie et al., "Upgrade of Software Images Based on Streaming Technique," filed Sep. 25, 2014, p. 1-43, U.S. Appl. No. 14/496,353, 43 pages.

HP, "HP Image Manager," Product documentation, May 27, 2009, Version 4, Hewlett-Packard Development Company, L.P., http://www8.hp.com/h20195/v2/GetHTML.aspx?docname=c04140545, Accessed on: Oct. 3, 2014.

IBM, "iBoot—Remote Boot over iSCSI," Storage Research, https://www.research.ibm.com/haifa/projects/storage/iboot/index.html, Accessed on: Oct. 3, 2014, 1 page.

IBM System X, "BladeBoot SAN Guide," Software-Based iSCSI Boot SAN Guide for IBM Blades, Jun. 6, 2008, Version 2.02, IBM Corp, 24 pages.

Madden, "A better way to manage Citrix servers: Centralized block-level disk image streaming," Block-level Disk Streaming for Citrix Servers, Mar. 2006, 9 pages.

(56) References Cited

OTHER PUBLICATIONS

Ni et al., "Security enhanced virtual disk encryption system and technology," Journal of Computer Applications, Nov. 2009, vol. 29, No. 11, 4 pages.

Q Archive, "Data Security and Disk Encryption Software Creates virtual encrypted disk on your system," http://encrypted-disk.qarchive.org/, Accessed on: Apr. 30, 2010, 5 pages.

Shinder, "What is Dynamic Virtual Client Computing? Or, What's the Problem with VDI and Why XP Mode is a Good Thing," WindowsNetworking.com, Sep. 8, 2009, TechGenix Ltd., http://www.windowsnetworking.com/articles-tutorials/netgeneral/What-Dynamic-Virtual-Client-Computing-Whats-Problem-VDI-Why-XP-Mode-Good-Thing.html, Accessed on: Apr. 22, 2010, 4 pages.

Suzaki et al., "TPM + Internet Virtual Disk + Platform Trust Services=Internet Client," ASPLOS '08, 2008, http://www.openlab.jp/oscirclar/, 1 page.

Van Hensbergen et al., "Dynamic Policy Disk Caching for Storage Networking," IBM Research Report, Nov. 28, 2006, IBM Research Division, 13 pages.

VMware, "VMware Workstation 6.5 Beta Release Notes," ACE Management Server Administrators Manual, Aug. 14, 2008, Workstation Version 6.5, VMware, Inc., http://www.vmware.com/products/beta/ws/releasenotes_ws65_beta.html, Accessed on: Oct. 3, 2014, 8 pages.

Youngssoft, "CCBoot," Diskless Boot WinXP/Win2003/Vista/Win2008 with iSCSI, Feb. 2009, Quick Start, www.ccboot.com, 15 pages.

\* cited by examiner

MANAGEMENT OF MULTIPLE SOFTWARE IMAGES WITH SHARED MEMORY BLOCKS

PRIORITY

The present application claims priority to European Patent Application No. 10194864.4, filed on 14 Dec. 2010, and all the benefits accruing therefrom under 35 U.S.C. §119, the contents of which are herein incorporated by reference in its entirety.

BACKGROUND

The present invention relates to data processing, and more particularly, to the management of software images.

Generally speaking, a software image is a structure that includes software modules residing on a computer (for example, its operating system, application programs, and/or data).

In some cases, it may be desirable to have multiple operating systems available on the same computer. For example, this may be useful to run programs that require different operating systems, or to test new operating systems or new versions thereof.

For this purpose, it is possible to exploit a multi-boot technique. The multi-boot technique allows installing multiple operating systems on the computer, with the possibility of choosing which one to boot when the computer is started. The desired result is achieved by splitting a hard disk of the computer into multiple partitions, each one defining a logical disk storing a corresponding operating system. The computer boots from a primary partition, which includes a boot loader that allows selecting the actual operating system to be started. Alternatively, it is possible to provide a boot partition with a primary boot loader that is simply used to select the desired operating system; the primary boot loader then invokes a secondary boot loader of the selected operating system for its starting.

However, the multi-boot technique is quite rigid, since the partitions of the hard disk are to be defined in advance. In any case, once the selected operating system has been started it has the entire control of the whole hard disk; therefore, the selected operating system may access the other partitions as well (with the risk of damaging them).

Alternatively, the same result may also be achieved by exploiting a virtualization technique. In this case, a hypervisor is installed on the computer. The hypervisor implements a virtualization layer, which emulates multiple virtual machines each one consisting of an abstract environment giving the appearance of a physical computer (which the virtual machine has sole control of). In this way, it is possible to have different operating systems running independently (even at the same time) on corresponding virtual machines.

However, the virtualization technique requires the installation of a complex infrastructure to manage the virtual machines. Moreover, this involves a performance degradation of the computer (since the operating systems do not run natively on the computer any longer).

Another common need is that of making backup copies of the software image of a computer. For example, this may be useful to restore the content of the computer in case of its malfunctioning.

For this purpose, it is possible to take a snapshot of the software image (i.e., a backup copy thereof in a consistent state at a particular point of time) and the snapshot may be saved onto a backup disk or a backup server. In this way, it is possible to restore the snapshot by re-installing it onto the computer from the backup disk or the backup server. However, both the process of taking the snapshot and the process of restoring the snapshot are very slow. In addition, in the case where the backup server is used, this involves a high consumption of network resources. A network connection with the backup server is required to restore the snapshot from the backup server. Alternatively, it is possible to boot the computer remotely from the snapshot on the backup server. However, in this case the computer has to be always connected to the backup server for its operation. In any case, the operation of the computer over the network results in a degradation of its performance.

U.S. Patent Publication No. 2008/0133208, which is herein incorporated by reference in its entirety, discloses a method for running a virtual machine directly from a computer using a (physical) snapshot. For this purpose, the virtual machine initializes using the physical snapshot as a virtual snapshot representing its initial state. For example, the virtual machine may be used to test updates, with the possibility as well of making the updates available to the computer if the test is successful (as a corresponding new physical snapshot), or to verify whether the execution of suspected programs indicates virus or spyware activities. As above, this requires the installation of a virtualization layer (with the above-mentioned drawbacks).

SUMMARY

According to exemplary embodiments, a method, apparatus, and computer program product are provided for managing multiple software images on a data processing entity that includes a mass memory with a plurality of memory locations, each of the memory locations having a corresponding memory address within the mass memory, each of the software images including a plurality of memory blocks, each of the memory blocks having a corresponding image address within the software image, by storing a single version of each memory block of at least a subset of all of the software images into a corresponding memory location, providing a control structure that associates each memory block with the memory location storing the single version of the memory block, relocating the memory blocks stored in boot locations of a current software image, the boot locations of each software image being the memory locations having the memory addresses equal to the image addresses of boot blocks of the software image including the memory blocks required to boot the data processing entity up to load an access function adapted to access the memory blocks of the software image, storing the boot blocks of the current software image into the corresponding boot locations, booting the data-processing entity from the boot blocks of the current software image in the corresponding boot locations thereby loading the access function, and serving, by the access function, each request to access a selected memory block of the current software image, the access function accessing the selected memory block in the associated memory location provided by the control structure.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Figure 1:
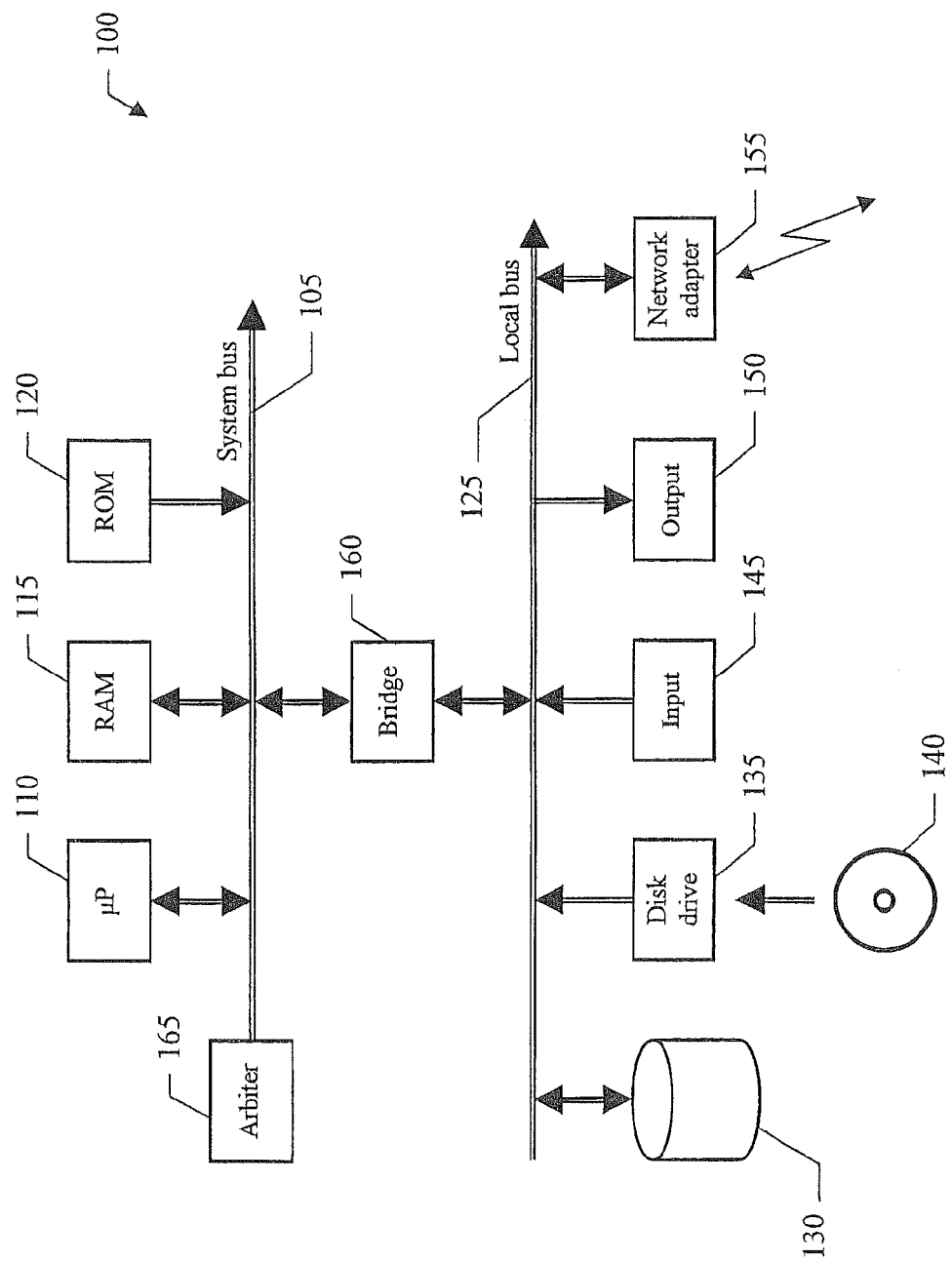
FIG. 1 shows a schematic block diagram according to an embodiment of the present invention.

With reference in particular to FIG. 1, there is shown a schematic block diagram of a computer 100 in accordance with an embodiment of the present invention. The computer 100 (for example, a personal computer or "PC") is formed by several units that are connected in parallel to a system bus 105. In detail, one or more microprocessors (µP) 110 control operation of the computer 100, a random access memory (RAM) 115 is used as a working memory by the microprocessors 110, and a read only memory (ROM) 120 stores basic code of the computer 100. Several peripheral units are clustered around a local bus 125 (by means of respective interfaces). Particularly, a mass memory includes one or more hard disks 130 and drives 135 for reading optical disks 140 (for example, digital video discs or "DVDs" and compact discs or "CDs"). Moreover, the computer 100 includes input units 145 (for example, a keyboard and a mouse), and output units 150 (for example, a monitor and a printer). An adapter 155 is used to connect the computer 100 to a network (not shown in the figure). A bridge unit 160 interfaces the system bus 105 with the local bus 120. Each microprocessor 110 and the bridge unit 160 can operate as a master agent requesting an access to the system bus 105 for transmitting information. An arbiter 165 manages the granting of the access with mutual exclusion to the system bus 105.

Figure 2:
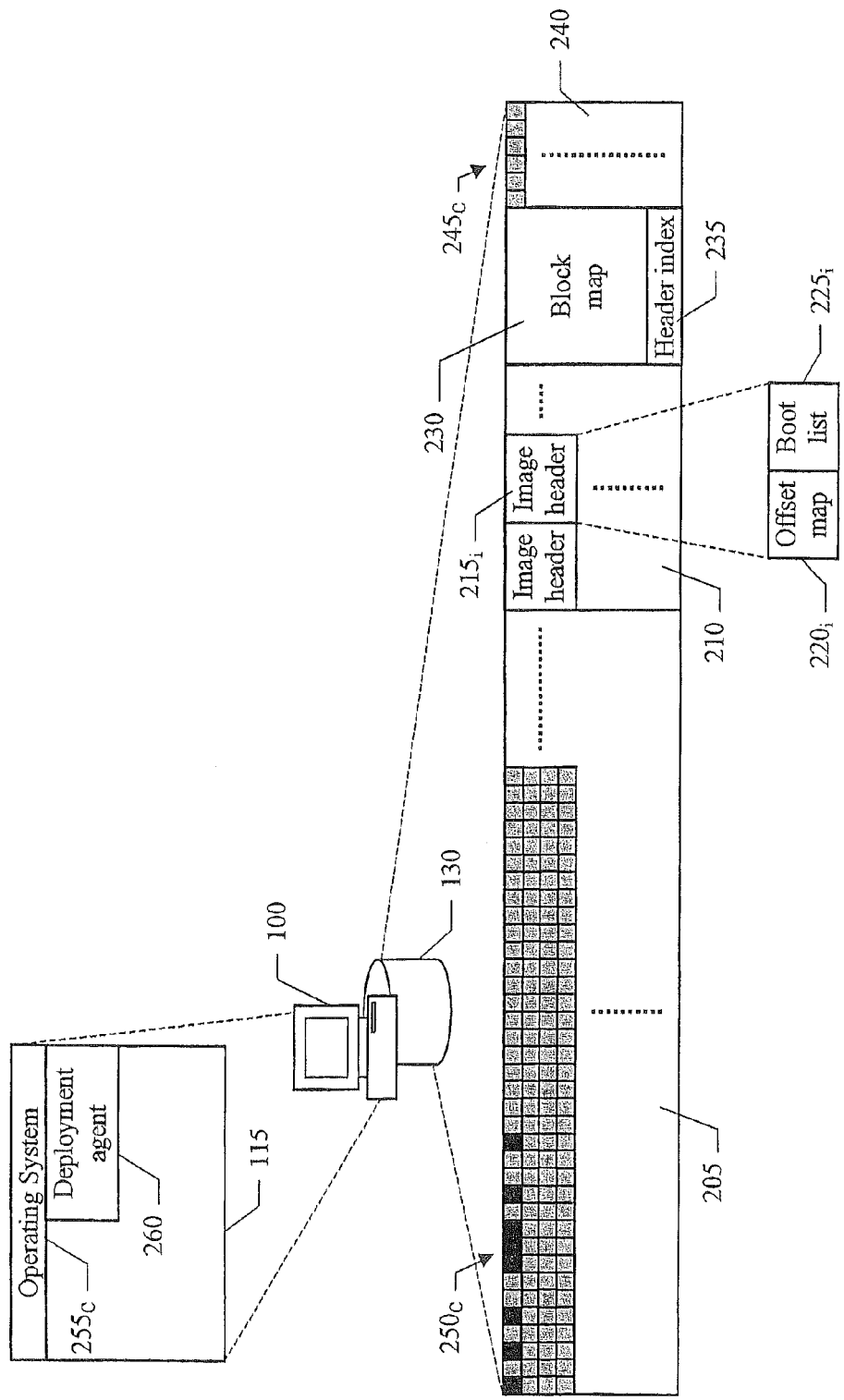
FIG. 2 shows an exemplary application according to an embodiment.

An exemplary application of an embodiment is shown in FIG. 2. Particularly, this embodiment is used to manage different software images on the computer 100. Each software image includes one or more software modules (for example, an operating system, application programs, and/or data). The software image is formed by a set of memory blocks (for example, each one having a size of 1-10 megabytes or "MBs"), which have corresponding addresses within the software image (referred to as image addresses).

For this purpose, the hard disk 130 is logically split into different portions. More in detail, most of the hard disk 130 is taken by an image portion 205 (starting from the beginning thereof). The image portion 205 is formed by a set of memory locations with corresponding addresses in the hard disk 130 (referred to as memory addresses), each one for storing a memory block of the software images. In an embodiment, a single version of each memory block of all the software images is stored into a corresponding memory location.

The rest of the hard disk 130 (at the end thereof) is instead used to store service information.

More specifically, a header portion 210 is reserved to store an image header $215_i$ for each software image. The image header $215_i$ includes an offset map $220_i$ and a boot list $225_i$. The offset map $220_i$ specifies a block offset for each memory block of the corresponding software image (identified by its image address), which block offset indicates the displacement of the memory block within the image portion 205 with respect to its position within the software image (i.e., equal to the difference, either positive or negative, between the memory address of the memory location storing the memory block and its image address). The block offset is equal to a null value when the corresponding memory block is not used. The image header $215_i$ is relatively small. For example, assuming that each block offset is coded with 5 bytes (B) (so as to allow values thereof in the range $\pm 2^{5*8-1}=2^{39}=500$ gigabytes or "GB", disregarding the null value, for addressing an image portion 205 of 2·500 GB=1 terabyte or "TB"), a software image of 100 GB with memory blocks of 2 MB requires an image header $215_i$ of 100 GB/2 MB*5 B=250 kilobytes (kB). The header portion 210 has a size providing the possibility of storing a relatively high number of image headers $215_i$ (for example, up to 10-50). The boot list $225_i$ specifies a list of the image addresses of boot blocks of the software image (referred to as boot addresses). The boot blocks include the memory blocks that are needed to start a boot sequence of the software image up to load a deployment agent (described in the following). For example, in Microsoft® Windows® the boot blocks include (in addition to the deployment agent) a master boot record (MBR), a boot sector, a bootmgr.exe file, a boot\bcd file, a system registry, a winload.exe file, and driver files specified in the system registry.

Moreover, a block map 230 specifies a block counter for each memory location of the image portion 205 (identified by its memory address). The block counter indicates the number of software images using the memory block stored in the memory location. The block counter is equal to zero when the memory location is free. The block map 230 is generally bigger than the image headers $215_i$. For example, assuming that block counter is coded with 1 B (so as to allow managing up to $2^8-1=255$ software images), an image portion of 1 TB with memory blocks of 2 MB requires a block map 230 of 100 TB/2 MB*1 B=400 MB. A header index 235 instead points to the image header $215_i$ of the software image that is currently active on the computer (referred to as current software image).

At the end, a relocation portion 240 of the hard disk 130 is used to relocate the memory locations of the image portion 205 having their memory addresses equal to the boot addresses of the current software image, where they are referred to as relocated memory locations $245_C$. The boot blocks of the current software image can then be copied into their boot locations, where they are shown in dark gray and denoted with the reference $250_C$ in FIG. 2. In this way, the boot blocks $250_C$ are arranged in the hard disk 130 exactly where they are expected to be found during the boot sequence of the current software image. This does not cause any loss of information in the image portion 205, since the corresponding memory blocks that are overridden are saved in the relocated memory locations $245_C$.

Therefore, when the computer 100 turns on, it boots normally from the hard disk 130. Indeed, a boot loader stored in a firmware of the computer 100 that is executed at its turn on, for example, the basic input/output system (BIOS), identifies the hard disk 130 as a bootable device. Therefore, the BIOS loads the MBR, the MBR loads the boot sector, the boot sector finds and starts the bootmgr.exe file, the bootmgr.exe finds and reads the boot\bcd file to determine the memory locations of and then load the system registry, the winload.exe file, and the driver files specified in the system registry, and the winload.exe starts the deployment agent. In this way, a portion of an actual operating system of the current software image corresponding to its boot blocks $250_C$ (denoted with the reference $255_C$) and the deployment agent (denoted with the reference 260) are loaded into the working memory 115.

Every request of accessing a selected memory block of the current software image during operation of the computer 100 is now served (as described in the following) by an access driver of the deployment agent 260, which overrides a standard file-system driver, not shown in the figure, of the operating system $255_C$. For this purpose, the deployment agent 260 preferably loads the image header $215_i$ of the current software image into the working memory 115, so as to make it faster the corresponding access.

The above-described technique allows for managing multiple software images on the computer 100 in a very easy way. Moreover, the different software images are completely segregated to one another. Each software image can only access the corresponding memory blocks (so as to prevent any risk of damaging the other software images).

This result is achieved without requiring any virtualization infrastructure. Therefore, the performance of the computer 100 is not adversely affected. Indeed, in this case only the software images (i.e., the memory locations where their memory blocks are stored) are virtualized. Conversely, the operating systems continue running natively on the computer 100.

Moreover, this solution is very flexible, since the number of software images and their sizes are not pre-determined. More generally, the number of software images and their sizes are not strictly determined by the available memory space on the hard disk 130 any longer, since they depend on the number of different memory blocks that are actually used by all the software images. Indeed, the memory blocks that are not used are not stored on the hard disk 130, and the memory blocks that are the same in different software images are shared (thereby avoiding their multiplication). This provides a significant memory space saving, especially when the software images only exploit a minimal part of their available memory space (as it occurs often in practice), and/or when they are slightly different from one another (for example, when several snapshots of the computer are taken over time).

Different exemplary operations that may be performed on the above-described computer according to corresponding embodiments of the invention are described in detail in the following.

Figure 3:
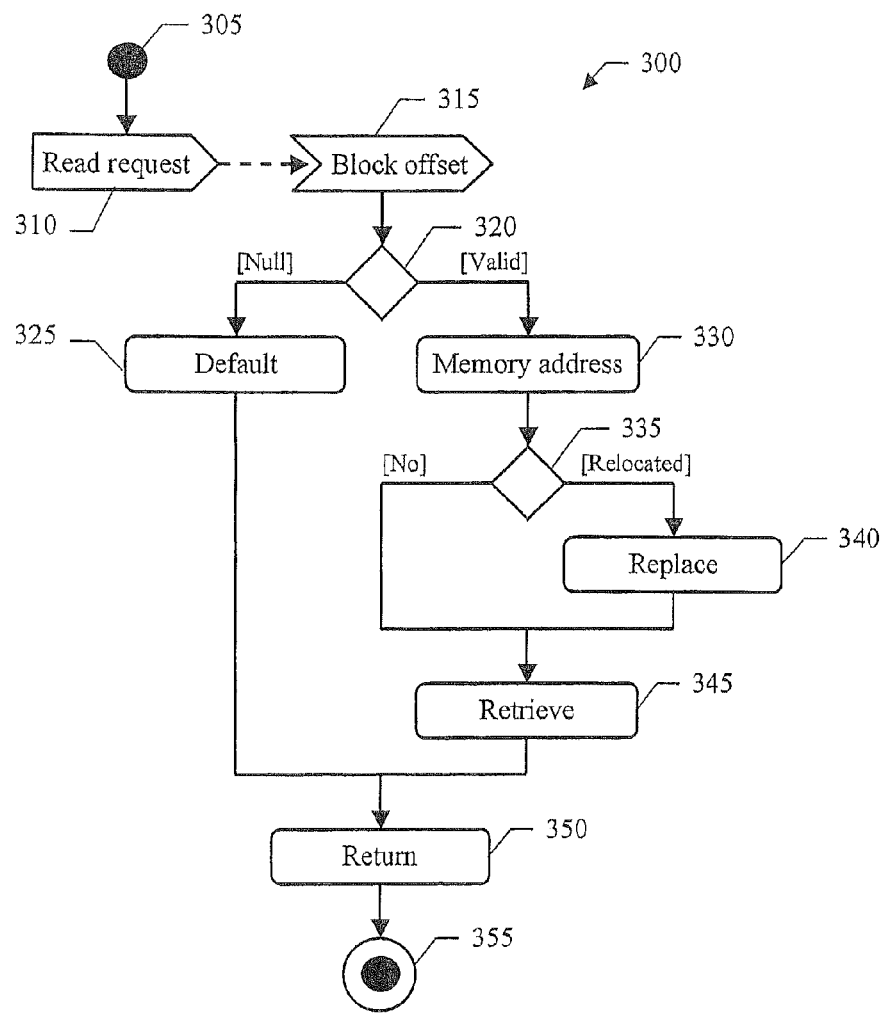
FIG. 3 shows an activity diagram describing the flow of activities relating to a read operation according to an embodiment of the invention.

Particularly, FIG. 3 shows an activity diagram describing the flow of activities relating to a read operation according to an embodiment of the invention. The read operation is represented with a method 300.

The method 300 begins at the black start circle 305, and then passes to block 310 as soon as a request for reading a selected memory block of the current software image (at a corresponding selected image address) is submitted to the file-system driver (for example, from an application program). The read request is passed at block 315 to the deployment agent, which retrieves the block offset of the selected memory block from the offset map of the current software image. The flow of activity then branches at block 320 according to the value of the block offset of the selected memory block.

When the block offset of the selected memory block is equal to the null value (meaning that the selected memory block is not used), the deployment agent at block 325 assigns a default value to the selected memory block (for example, by setting all its bits to 0).

Conversely, when the block offset of the selected memory block has a valid value (meaning that the selected memory block is used), the deployment agent at block 330 calculates the memory address of the memory location in the image portion that should store the selected memory block (referred to as selected memory location) by adding its block offset to its image address. A test is now made at block 335 to verify whether the selected memory location has been relocated to the relocation portion (i.e., when the memory address of the selected memory location is equal to one of the boot addresses of the current software image, as indicated in its boot list). If so, the deployment agent at block 340 sets the selected memory location equal to the corresponding relocated memory location (by replacing its memory address accordingly). The method 300 then descends into block 345; the same point is also reached from the block 335 directly when the selected memory location has not been relocated. At this point, the deployment agent retrieves the selected memory block from the selected memory location.

In any case, the flow of activity merges at block 350 (from either the block 325 or the block 345). The deployment agent now returns the selected memory block to the file-system driver, which in turn returns it to the application program. The method 300 then ends at the concentric white/black stop circles 355.

Figure 4:
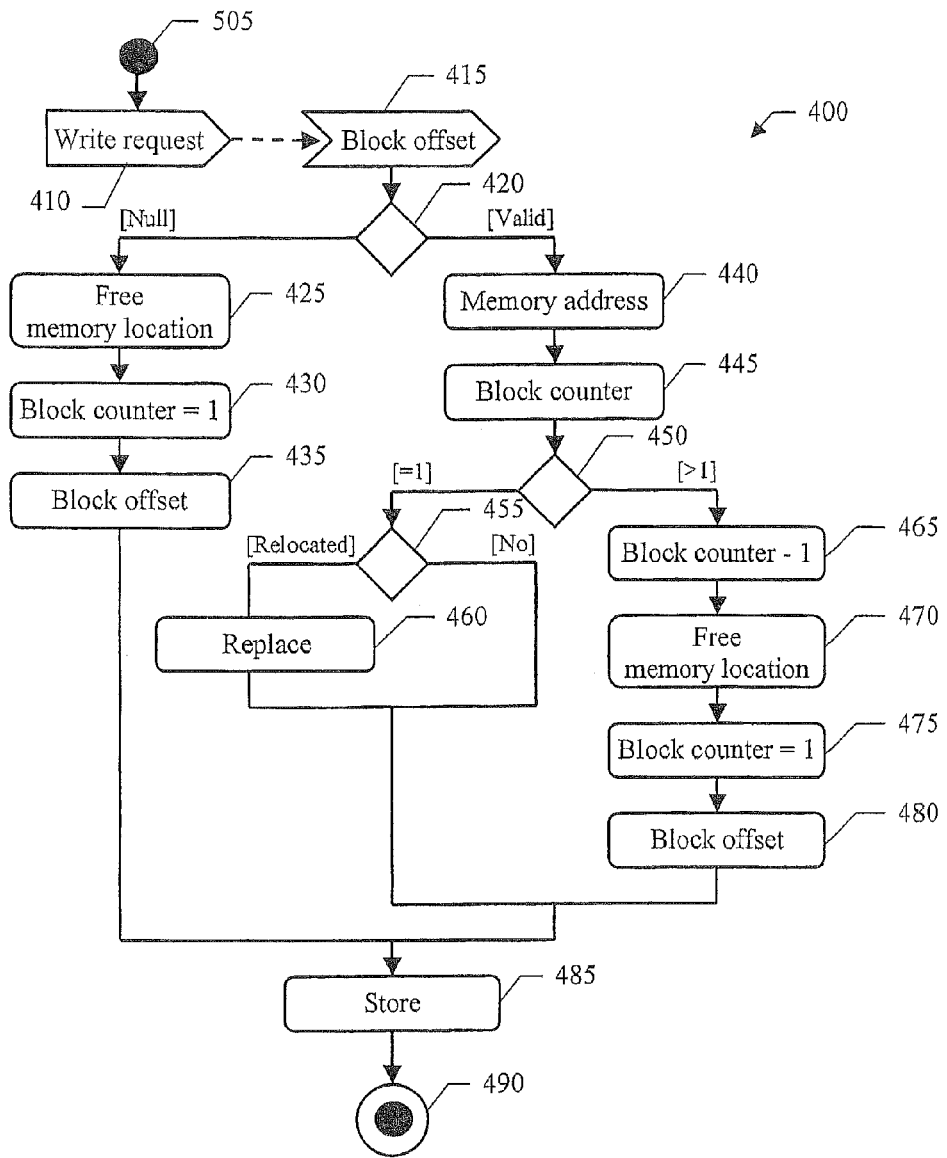
FIG. 4 shows an activity diagram describing the flow of activities relating to a write operation according to an embodiment of the invention.

FIG. 4 instead shows an activity diagram describing the flow of activities relating to a write operation according to an embodiment of the invention. The write operation is represented with a method 400.

The method 400 begins at the black start circle 405, and then passes to block 410 as soon as a request for writing a selected memory block of the current software image (at a corresponding selected image address) is submitted to the file-system driver (for example, from an application program). The write request is passed at block 415 to the deployment agent, which retrieves the block offset of the selected memory block from the offset map of the current software image. The flow of activity then branches at block 420 according to the value of the block offset of the selected memory block.

When the block offset of the selected memory block has the null value (meaning that the selected memory block is not used), the deployment agent at block 425 identifies a memory location in the image portion that is free to receive the selected memory block (referred to as selected memory location); for example, the first one with the corresponding block counter equal to zero in the block map. The deployment agent then sets the block counter of the selected memory location to one at block 430 (to indicate that it is now used by the current software image). Continuing to block 435, the deployment agent calculates the block offset of the selected memory location, by subtracting the image address of the selected memory block from the memory address of the selected memory location. The block offset of the selected memory location is then stored into the offset map of the current software image (to indicate that the selected memory block is stored in the selected memory location).

Returning to block 420, when the block offset of the selected memory block has a valid value (meaning that the selected memory block is used), the deployment agent at block 440 calculates the memory address of the memory location storing the selected memory block (again referred to as selected memory location), by adding its block offset to its image address. Continuing to block 445, the deployment agent now retrieves the block counter of the selected memory location from the block map. The flow of activity further branches at block 450 according to the value of the block counter of the selected memory location.

When the block counter of the selected memory location is equal to one (meaning that the selected memory block is used by the current software image only), a test is made at block 455 to verify whether the selected memory location has been relocated to the relocation portion (i.e., when the memory address of the selected memory location is equal to one of the boot addresses of the current software image, as indicated in its boot list). If so, the deployment agent at block 460 sets the selected memory location equal to the corresponding relocated memory location (by replacing its memory address accordingly).

Conversely, when the block counter of the selected memory block is found higher than one at block 450 (meaning that the selected memory block is used by other software images in addition to the current software image), the method 400 descends into block 465. At block 465, the deployment agent decreases the block counter of the selected memory location by one (to indicate that it is not used by the current software image any longer). With reference now to block 470, the deployment agent identifies a memory location in the image portion that is free to receive the selected memory block (becoming the selected memory location). The deployment agent then sets the block counter of the selected memory location to one at block 475 (to indicate that it is now used by the current software image). Continuing to block 480, the deployment agent calculates the block offset of the selected memory location by subtracting the image address of the selected memory block from the memory address of the selected memory location. The block offset of the selected memory block is then stored into the offset map of the current software image (to indicate that the selected memory block is stored in the selected memory location).

The flow of activity merges at block 485 from the block 435, from the block 460, or from the block 480. In any case, the selected memory block is now stored into the selected memory location. The method 400 then ends at the concentric white/black stop circles 490.

Figure 5:
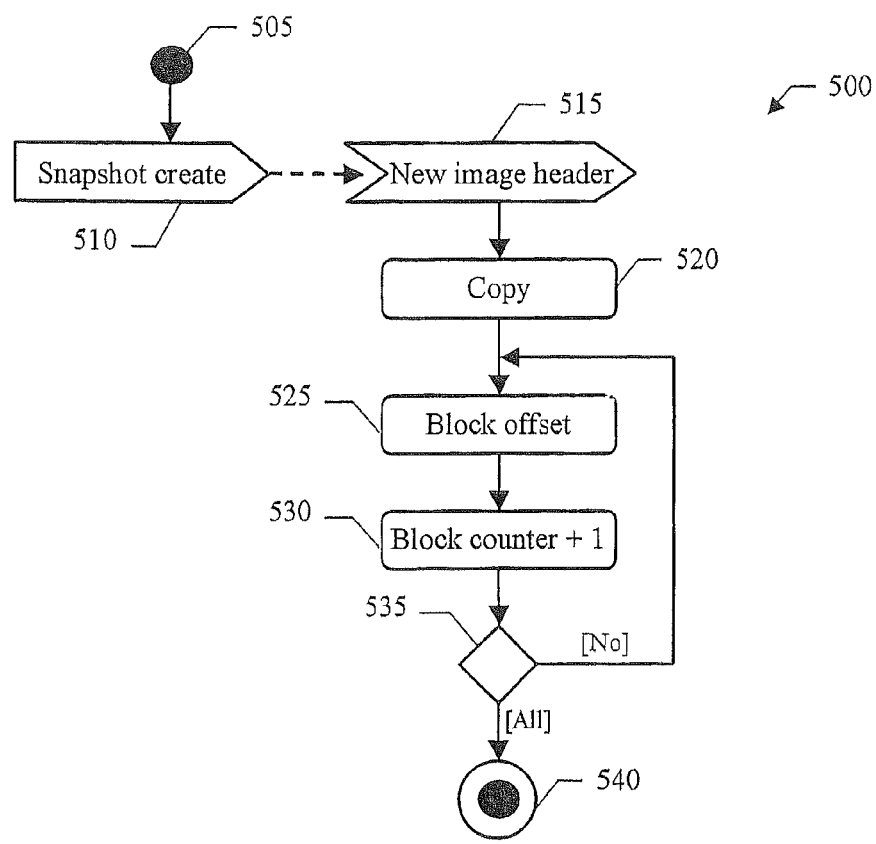
FIG. 5 shows an activity diagram describing the flow of activities relating to an operation of snapshot creation according to an embodiment of the invention.

FIG. 5 shows an activity diagram describing the flow of activities relating to an operation of snapshot creation according to an embodiment of the invention. The operation is represented with a method 500.

The method 500 begins at the black start circle 505, and then passes to block 510 as soon as a request for creating a snapshot of a source software image (referred to as target software image) is submitted to the deployment agent. In response thereto, the deployment agent at block 515 creates a new image header for the target software image in the header portion (with the same size as the image header of the source software image). Continuing to block 520, the deployment agent copies the offset map and the boot list of the source software image into the image header of the target software image. A loop is then performed for each memory block of the target software image (as indicated in its offset map). The loop begins at block 525, where the deployment agent retrieves the block offset of a present memory block (starting from the first one) from the offset map of the target software image. The memory address of the memory location storing the present memory block (referred to as present memory location) is then calculated by adding its block offset to its image address. Continuing to block 530, the deployment agent increases the block counter of the present memory location by one in the block map (to indicate that it is used by the target image as well). A test is now made at block 535 to verify whether all the memory blocks of the target software image have been processed. If not, the flow of activity returns to the block 525 to repeat the same operations on a next memory block of the target software image. Conversely, the loop is exited and the method 500 ends at the concentric white/black stop circles 540.

Therefore, the operation of creating a snapshot of a software image is quite fast, since it does not require the copying of the corresponding memory blocks.

Figure 6:
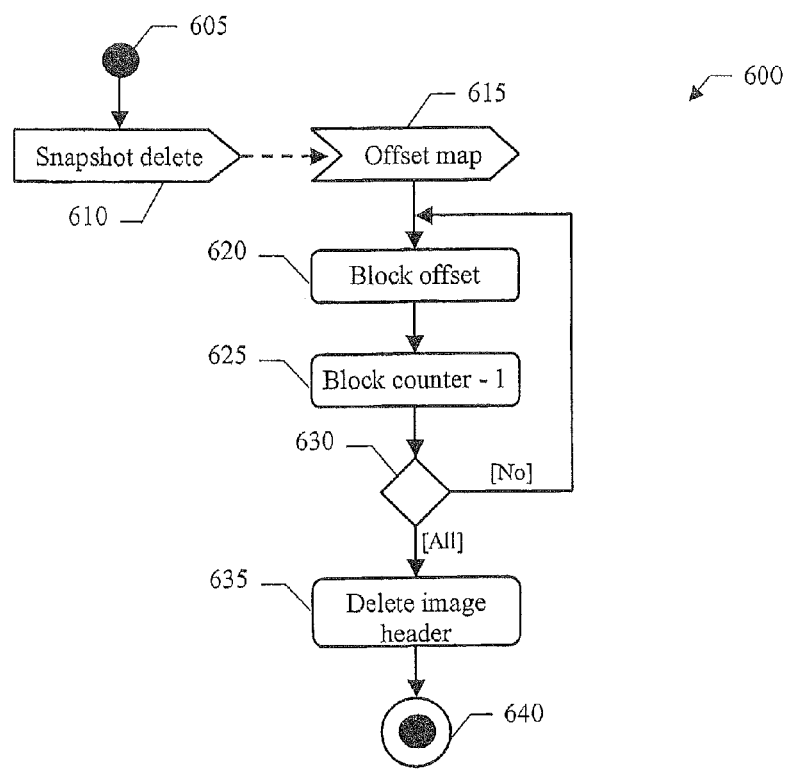
FIG. 6 shows an activity diagram describing the flow of activities relating to an operation of snapshot deletion according to an embodiment of the invention.

FIG. 6 shows an activity diagram describing the flow of activities relating to an operation of snapshot deletion according to an embodiment of the invention. The operation is represented with a method 600.

The method 600 begins at the black start circle 605, and then passes to block 610 as soon as a request for deleting an obsolete software image is submitted to the deployment agent. In response thereto, the deployment agent accesses the offset map of the obsolete software image at block 615. A loop is then performed for each memory block of the obsolete software image (as indicated in its offset map). The loop begins at block 620, where the deployment agent retrieves the block offset of a present memory block (starting from the first one) from the offset map of the obsolete software image. The memory address of the memory location storing the present memory block (referred to as present memory location) is then calculated, by adding its block offset to its image address. Continuing to block 625, the deployment agent decreases the block counter of the present memory location by one in the block map (to indicate that it is not used by the obsolete software image any longer). Particularly, if the present memory location was used by the obsolete software image only, its block counter becomes zero to indicate that the present memory location is free. A test is now made at block 630 to verify whether all the memory blocks of the obsolete software image have been processed. If not, the flow of activity returns to the block 620 to repeat the same operations on a next memory block of the obsolete software image. Conversely, the loop is exited by descending into block 635, at this point, the deployment agent deletes the image header of the obsolete software image. The method 600 then ends at the concentric white/black stop circles 640.

Therefore, the operation of deleting a software image as well is quite fast, since it does not require any actual action on its memory blocks.

Figure 7:
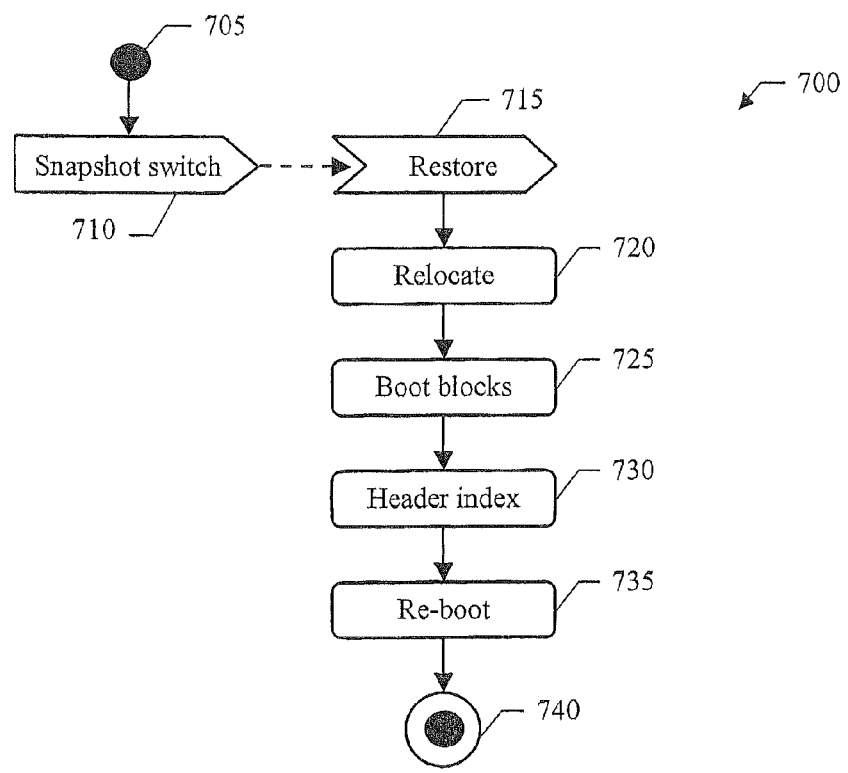
FIG. 7 shows an activity diagram describing the flow of activities relating to an operation of snapshot switching according to an embodiment of the invention.

FIG. 7 shows an activity diagram describing the flow of activities relating to an operation of snapshot switching according to an embodiment of the invention. The operation is represented with a method 700.

The method 700 begins at the black start circle 705, and then passes to block 710 as soon as a request for switching to another software image is submitted to the deployment agent. In response thereto, the deployment agent at block 715 restores the memory blocks from the relocated locations to the boot locations of the current software image (as indicated in its boot list). Continuing to block 720, the deployment agent relocates the memory blocks stored in the boot locations of the other software image (as indicated in its boot list)

to the relocation portion. With reference now to block 725, the deployment agent copies the boot blocks of the other software image into their boot locations. The flow of activity continues to block 730, where the deployment agent updates the header index to point to the image header of the other software image.

At this point, the deployment agent at block 735 turns off and then turns on the computer, so as to re-boot it from the boot blocks of the other software image in its boot locations. As a result, a portion of an operating system of the other software image corresponding to its boot blocks and the deployment agent are loaded into the working memory of the computer (so that every request of accessing a selected memory block of the other software image is served by the deployment agent exactly as above). The method 700 then ends at the concentric white/black stop circles 740.

Therefore, the operation of switching to another software image (for example, for reverting to a previous snapshot of the computer) is very fast, since it only requires the copy of the corresponding boot blocks. This may be very useful in specific applications (for example, when multiple software images are provided in a cloud computing architecture for their use on demand).

Figure 8:
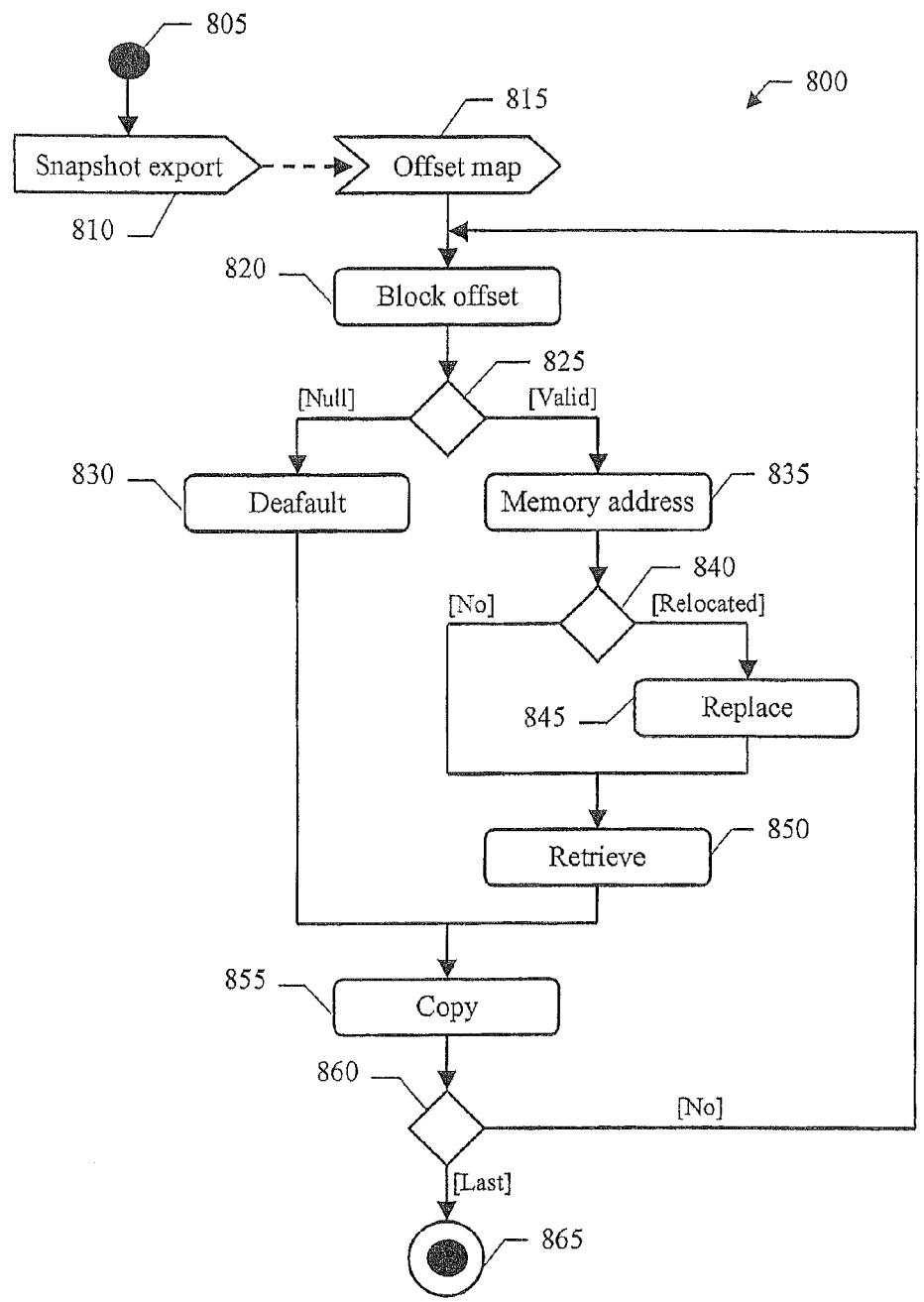
FIG. 8 shows an activity diagram describing the flow of activities relating to an operation of snapshot export according to an embodiment of the invention.

FIG. 8 shows an activity diagram describing the flow of activities relating to an operation of snapshot export according to an embodiment of the invention. The operation is represented with a method 800.

The method 800 begins at the black start circle 805, and then passes to block 810 as soon as a request for exporting a selected software image onto an external device (for example, a removable storage unit or a remote server) is submitted to the deployment agent. In response thereto, the deployment agent accesses the offset map of the selected software image at block 815. A loop is then performed for each memory block of the selected software image (as indicated in its offset map). The loop begins at block 820, where the deployment agent retrieves the block offset of a present memory block (starting from the first one) from the offset map of the selected software image.

The flow of activity then branches at block 825 according to the value of the block offset of the present memory block. When the block offset of the present memory block is equal to the null value (meaning that the present memory block is not used), the deployment agent at block 830 assigns a default value to the present memory block (for example, by setting all its bits to zero). Conversely, when the block offset of the present memory block has a valid value (meaning that the present memory block is used), the deployment agent at block 835 calculates the memory address of the memory location in the image portion that should store the present memory block (referred to as present memory location), by adding its block offset to its image address. A test is now made at block 840 to verify whether the present memory location has been relocated to the relocation portion (i.e., when the memory address of the present memory location is equal to one of the boot addresses of the current software image, as indicated in its boot list). If so, the deployment agent at block 845 sets the present memory location equal to the corresponding relocated memory location (by replacing its memory address accordingly). The method 800 then descends into block 850; the same point is also reached from the block 840 directly when the present memory location has not been relocated. At this point, the deployment agent retrieves the present memory block from the present memory location. In any case, the flow of activity merges at block 855 (from either the block 830 or the block 850) and the deployment agent now copies the present memory block onto the external device.

A test is now made at block 860 to verify whether all the memory blocks of the selected software image have been processed. If not, the flow of activity returns to the block 820 to repeat the same operations on a next memory block of the selected software image. Conversely, the loop is exit, and the method 800 ends at the concentric white/black stop circles 865.

Figure 9:
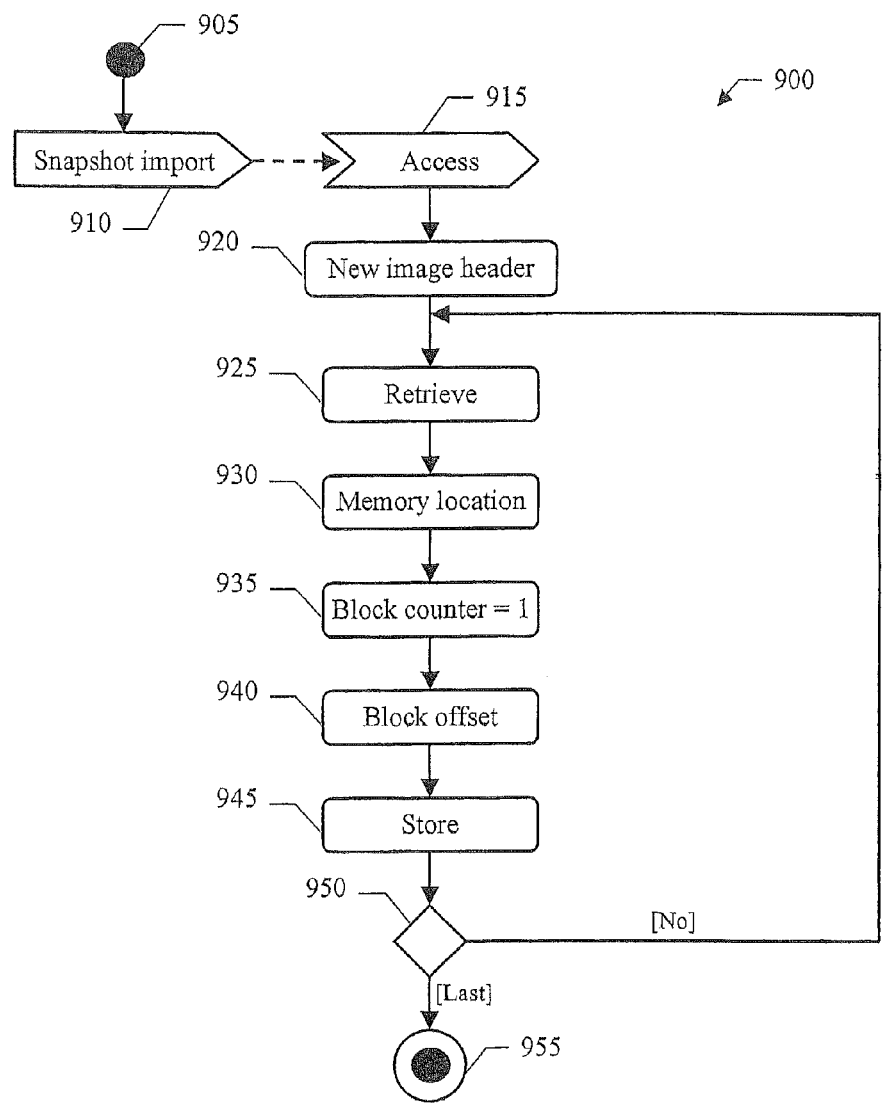
FIG. 9 shows an activity diagram describing the flow of activities relating to an operation of snapshot import according to an embodiment of the invention.

FIG. 9 shows an activity diagram describing the flow of activities relating to an operation of snapshot import according to an embodiment of the invention. The operation is represented with a method 900.

The method 900 begins at the black start circle 905, and then passes to block 910 as soon as a request for importing an external software image from an external device (for example, a removable storage unit or a remote server) is submitted to the deployment agent. In response thereto, the deployment agent accesses the external software image on the external device at block 915. Continuing to block 920, the deployment agent creates a new image header for the external software image in the header portion. The image header of the external software image includes an offset map with a number of block offsets corresponding to the size of the imported software image and a boot list being set to the boot addresses of the imported software image (as specified in the external device in association therewith).

A loop is then performed for each memory block of the external software image. The loop begins at block 925, where the deployment agent retrieves a present memory block (starting from the first one) from the external device. Passing to block 930, the deployment agent identifies a memory location in the image portion that is free to receive the present memory block (referred to as present memory location). The deployment agent then sets the block counter of the present memory location to one at block 935 (to indicate that it is now used by the external software image). Continuing to block 940, the deployment agent calculates the block offset of the present memory location, by subtracting the image address of the present memory block from the memory address of the present memory location. The block offset of the present memory block is then stored into the offset map of the external software image. The present memory block is now stored into the present memory location at block 945.

A test is now made at block 950 to verify whether all the memory blocks of the external software image have been processed. If not, the flow of activity returns to the block 925 to repeat the same operations on a next memory block of the external software image. Conversely, the loop is exit, and the method 900 ends at the concentric white/black stop circles 955.

The above described technique may also be used to deploy software images onto the computer. In this respect, reference is now made to FIG. 10A-FIG. 10D, which show a collaboration diagram representing the roles of the main software components that may be used to implement a deployment process according to an embodiment of the invention. Particularly, the figures describe the static structure of the system (by means of the corresponding components, denoted as a whole with the reference 1000) and its dynamic behavior (by means of a series of exchanged messages, each one representing a corresponding action, denoted with progressive sequence numbers).

Figure 10A:
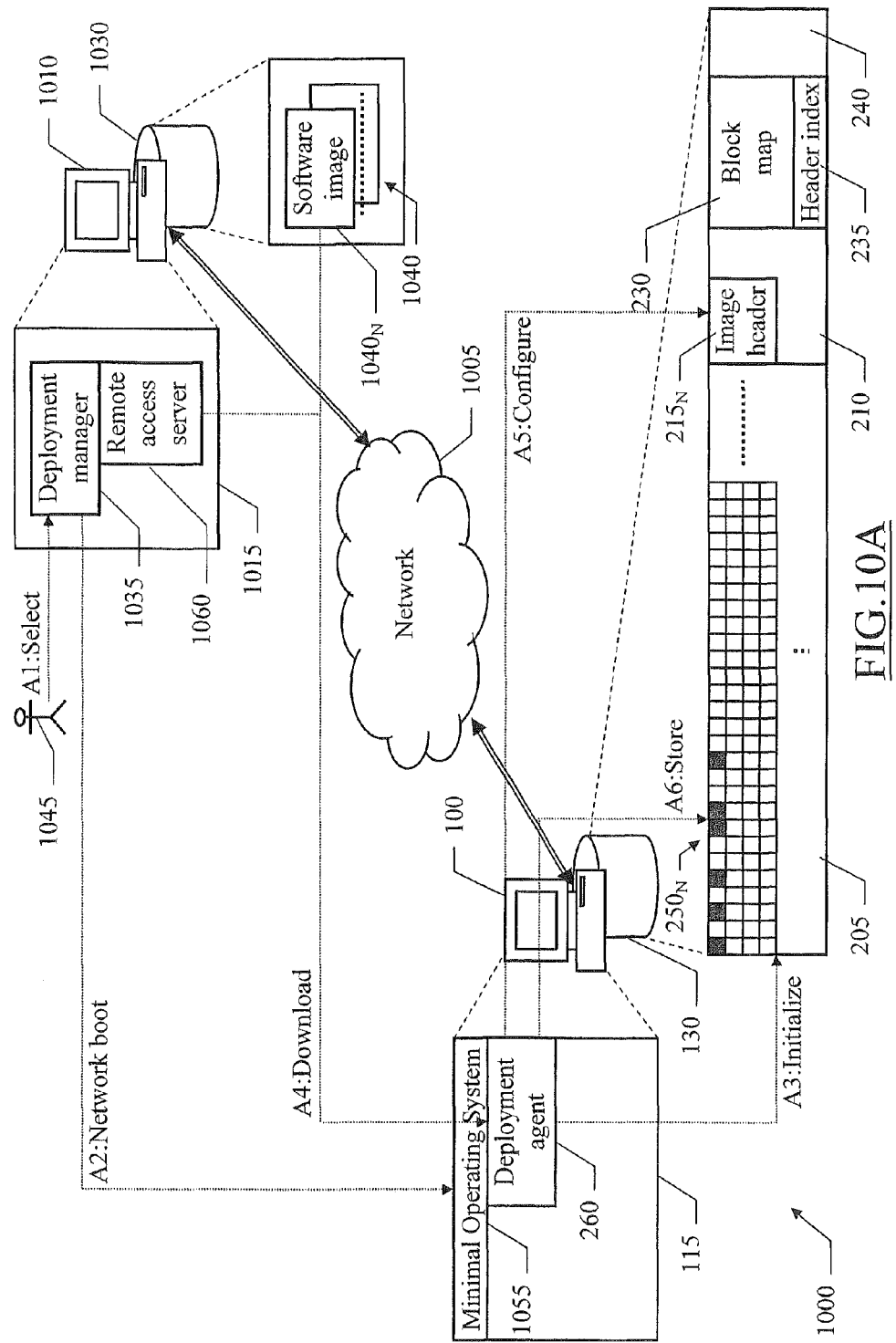
FIG. 10A-FIG. 10D show a collaboration diagram representing the roles of the main software components that may be used to implement a deployment process according to an embodiment of the invention.

Starting with FIG. 10A, the computer 100 is connected through a network 1005 (for example, a local area network or "LAN") to a server computer (or simply server) 1010.

The server 1010 (with its working memory and hard disk, denoted with the references 1015 and 1030, respectively) runs a deployment manager 1035, for example, the IBM®

Tivoli® Provisioning Manager for Images of the IBM® Tivoli® Provisioning Manager for OS Deployment. (IBM and Tivoli are trademarks of International. Business Machines Corporation, registered in many jurisdictions worldwide.) The deployment manager 1035 is used to automate the deployment of software images 1040 (stored in a corresponding repository) onto any (client) computer connected thereto.

Particularly, whenever a new software image (denoted with the reference $1040_N$) is to be deployed onto the computer 100, an operator 1040 selects the computer 100 and new software image $1040_N$ through the deployment manager 1035, for example, by connecting with a browser running on another client computer, not shown in the figure (action "A1:Select"). In response thereto, the deployment manager 1035 turns on the computer 100. As a consequence, assuming that the computer 100 does not have any functioning operating system, it boots over the network 1005. Particularly, the boot loader of the computer 100 does not find any bootable device, and then launches a network boot loader, for example, the preboot execution environment (PXE) embedded in its network adapter. The network boot loader exploits a dynamic address service, for example, based on the dynamic host configuration protocol (DHCP), to obtain a dynamic address for the computer 100 from the server 1010 (acting as a DHCP server). The server 1010 also provides an address of a network bootstrap program that is downloaded into a RAM disk of the computer 100 (i.e., a portion of its working memory 115 that is treated as a mass memory) and then launched. The network bootstrap program, for example, the Microsoft Windows Pre-installation Environment provides a minimal operating system 1055, which includes the deployment agent 260 (action "A2:Network boot"). (Microsoft and Windows are trademarks of Microsoft Corporation in the United States, other countries, or both.)

The deployment agent 260 initializes the hard disk 130 by defining its image portion 205, header portion 210 (without any image header), block map 230 (with the block counters of all the memory locations in the image portion 205 set to zero to indicate that they are free), header index 235, and relocation portion 240 (action "A3:Initialize"). The deployment agent 260 then downloads the boot blocks of the new software image $1040_N$ from the server 1010. For this purpose, the deployment agent 260 acts as a remote access initiator that interacts with a remote access server 1060 of the server computer 1035, for example, based on the Internet small computer system interface (iSCSI) protocol (action "A4:Download"). The deployment agent 260 then creates a new image header for the new software image $1040_N$ (denoted with the reference $215_N$) in the header portion 210. The image header $215_N$ includes an offset map with a number of block offsets corresponding to the size of the new software image $1040_N$ (all of them set to the null value, in this case also to indicate that the corresponding memory blocks are not available in the hard disk 130). The image header $215_N$ also includes a boot list being set to the boot addresses of the new software image $1040_N$, as specified in the corresponding repository in association therewith (action "A5:Configure"). The deployment agent 260 can now store the boot blocks of the new software image $1040_N$ into the corresponding boot locations in the image portion 205, where they are shown in FIG. 10A as dark gray and denoted with the reference $250_N$. At the same time, the block offset of each boot block in the offset map of the image header $215_N$ is set to the corresponding boot address. Moreover, the block counter of each boot location in the block map 230 is set to one to indicate that it is now used by the new software image $1040_N$ (action "A6:Store"). At this point, the deployment agent 260 turns off and then turns on the computer 100.

Figure 10B:
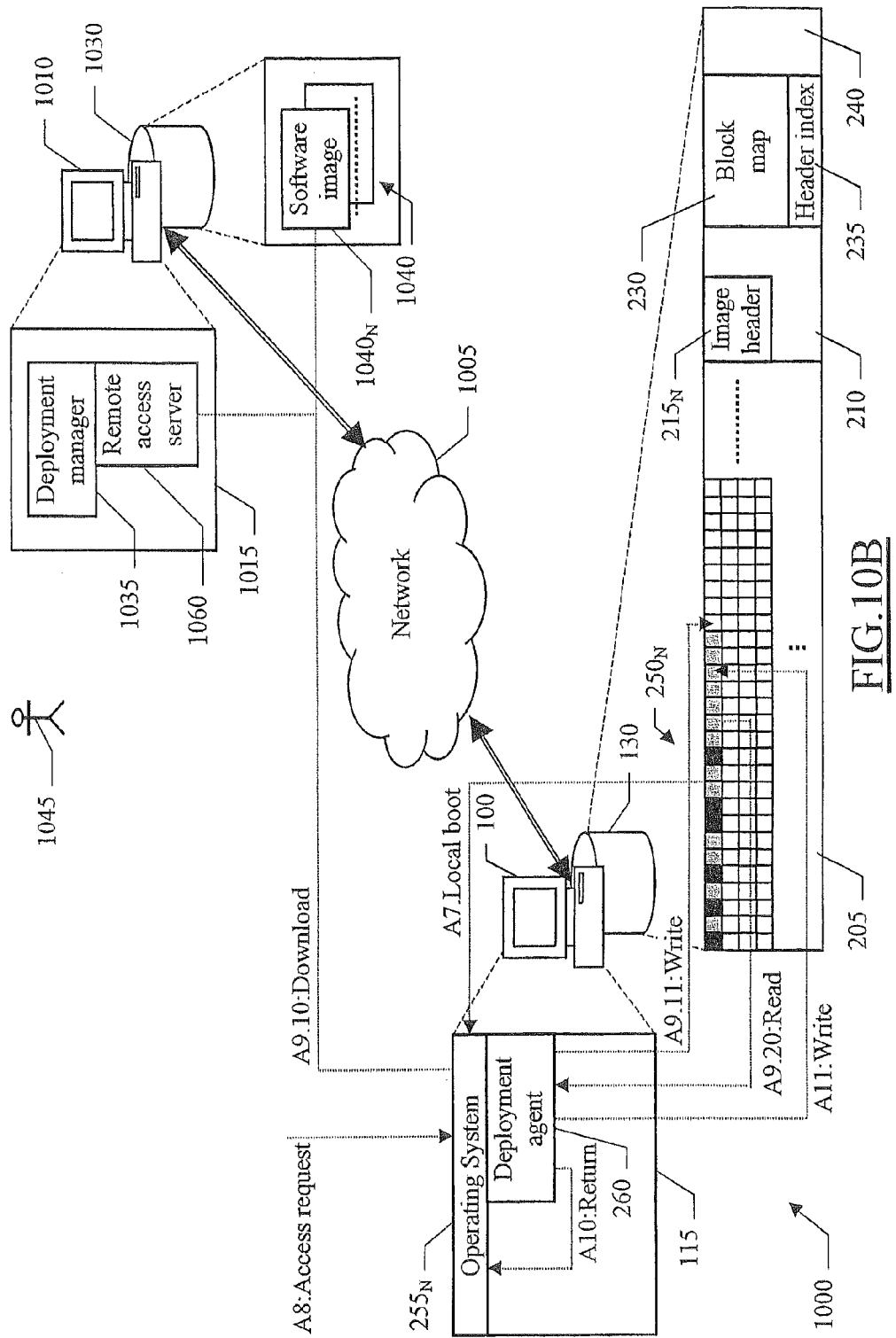

Therefore, as shown in FIG. 10B, the computer 100 now boots from the boot blocks $250_N$, thereby loading a portion of an operating system of the new software image $1040_N$ corresponding to its boot blocks $250_N$ (denoted with the reference $255_N$) and the deployment agent 260 (including the image header $215_N$) into the working memory 115 (action "A7: Local boot"). Every request of accessing a selected memory block of the new software image $1040_N$ during operation of the computer 100 is now served by a streaming driver of the deployment agent 260 (which again overrides a standard file system driver, not shown in the figure, of the operating system $255_N$).

Particularly, the file system driver receives a request for accessing the selected memory block, for example, from an application program, not shown in the figure. The file system drivers pass the request to the deployment agent 260 (action "A8:Access request"). When the selected memory block has been requested for reading, the deployment agent 260 verifies whether the selected memory block is available in the hard disk 130 (as indicated by the corresponding block offset in the offset map of the image header $215_N$). When the selected memory block is not available in the hard disk 130 (i.e., its block offset is equal to the null value) the deployment agent 260 passes the request to a remote access driver, not shown in the figure, of the operating system $255_N$ (acting as an iSCSI initiator in the example at issue). The remote access driver downloads the selected memory block from the software image $1040_N$ (on the server 1010) through the remote access server 1060. The remote access driver then returns the selected memory block to the deployment agent 260 (action "A9.10:Download"). The deployment agent 260 stores the selected memory block into the hard disk 130 by performing a corresponding write operation as described above (in this case, with the selected memory block that is always stored into a free memory location of the image portion 205), so as to progressively fill the image portion 205 with memory blocks of the new software image $1040_N$ being depicted in gray (action "A9.11:Write"). Conversely, if the selected memory block is already available in the hard disk 130 (i.e., its block offset has a valid value) the deployment agent 260 retrieves the selected memory block directly from it, by performing a corresponding read operation as described above (Action "A9.20.Read"). In both cases, the deployment agent 260 returns the selected memory block to the file system driver, which in turn returns it to the application program (action "A10:Return"). When the selected memory block has instead been requested for writing, the deployment agent 260 writes it onto the hard disk 130 directly by performing a corresponding write operation as described above (action "A11:Write"). Therefore, the new software image $1040_N$ can be updated normally (as if it was already completely deployed onto the computer 100) even when the deployment process is still in progress.

Figure 10C:
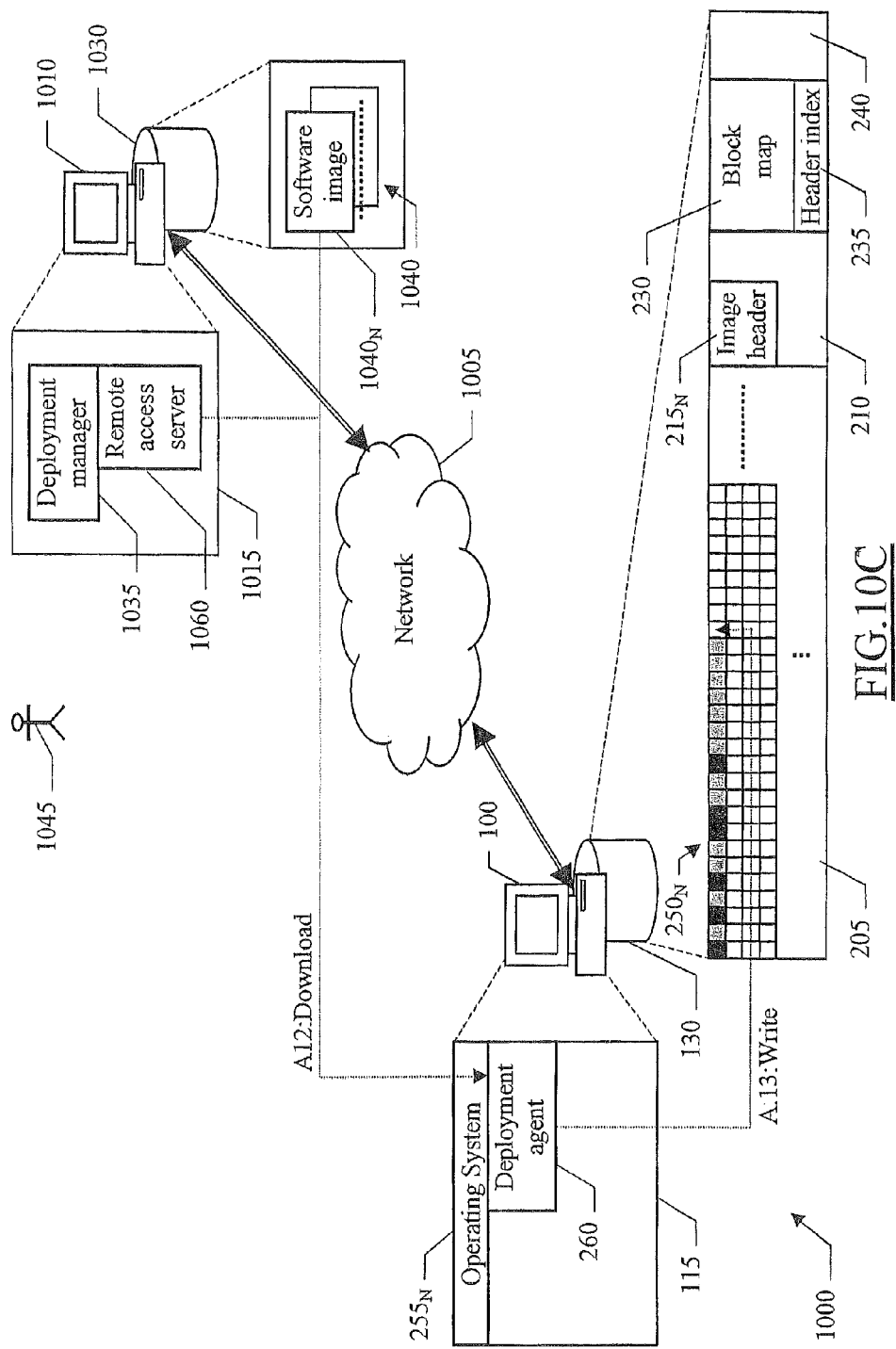

With reference now to FIG. 10C, in a completely asynchronous way the deployment agent 260 periodically verifies (for example, every 10-100 milliseconds or "ms") a workload of the server 1010, of the computer 100 and/or of the network 1005. If the workload is lower than a predefined threshold (indicating that the corresponding resources are under-exploited at the moment, for example, because no action is performed on the server 1010 and/or on the computer 100, and traffic in the network 1005 is low), the deployment agent 260 downloads a new memory block of the new software image $1040_N$ that is still not available in the hard disk 130 (for example, the first one whose block offset in the offset map of the image header $215_N$ is equal to the null value) through the remote access server 1060 (action "A12:Download"). The deployment agent 260 then writes the new memory block into the hard disk 130 as above (action "A13:Write"). In this way, it is possible to ensure that all the memory blocks of the new software image $1040_N$ will be downloaded at the end (even if they are never used). When this occurs, it is possible to disable the streaming function of the deployment agent 260 (and then disconnect the computer 100 from the server 1010 as well).

The above-described streaming technique makes the computer 100 ready to use in a very short time, just after the boot blocks $250_N$ of the new software image $1040_N$ have been stored into the hard disk 130, even if the deployment process is still in progress (for example, after 1-2 minutes for a typical size of the boot blocks of 10-200 MBs). The operation of the computer 100 is then entirely normal (with its booting directly from the hard disk 130 as usual), irrespectively of the availability or not of the other memory blocks of the new software image $1040_N$ in the hard disk 130, with only a slight degradation of performance of the computer 100 when it accesses memory blocks that are still to be downloaded from the server 1010. Moreover, the time required to have the computer 100 ready to use is independent of the size of the new software image $1040_N$. The usage of the network 1005 also decreases over time (for example, with a logarithmic law), since more and more memory blocks will be already available on the computer 100 once they have been accessed once. In this respect, it should be noted that this streaming technique has nothing to do with the ones that are known in the art for providing software images on demand. Indeed, in the known streaming techniques, memory blocks of the software images are downloaded onto the computer only for their immediate use. However, these memory blocks are not stored permanently on the computer (i.e., they disappear after they have been used, and in any case after the computer is turned off), so that they have to be downloaded again for any next use thereof. As a consequence, the computer can never be disconnected from the server. Indeed, even when the memory blocks are pre-fetched, they remain on the computer only until their (possible) next use. Likewise, even when a local cache for the memory blocks is implemented, only few memory blocks remain in the local cache for their re-use (in any case, with the least recently used memory blocks in the local cache that are ultimately evicted for storing new memory blocks).

Figure 10D:
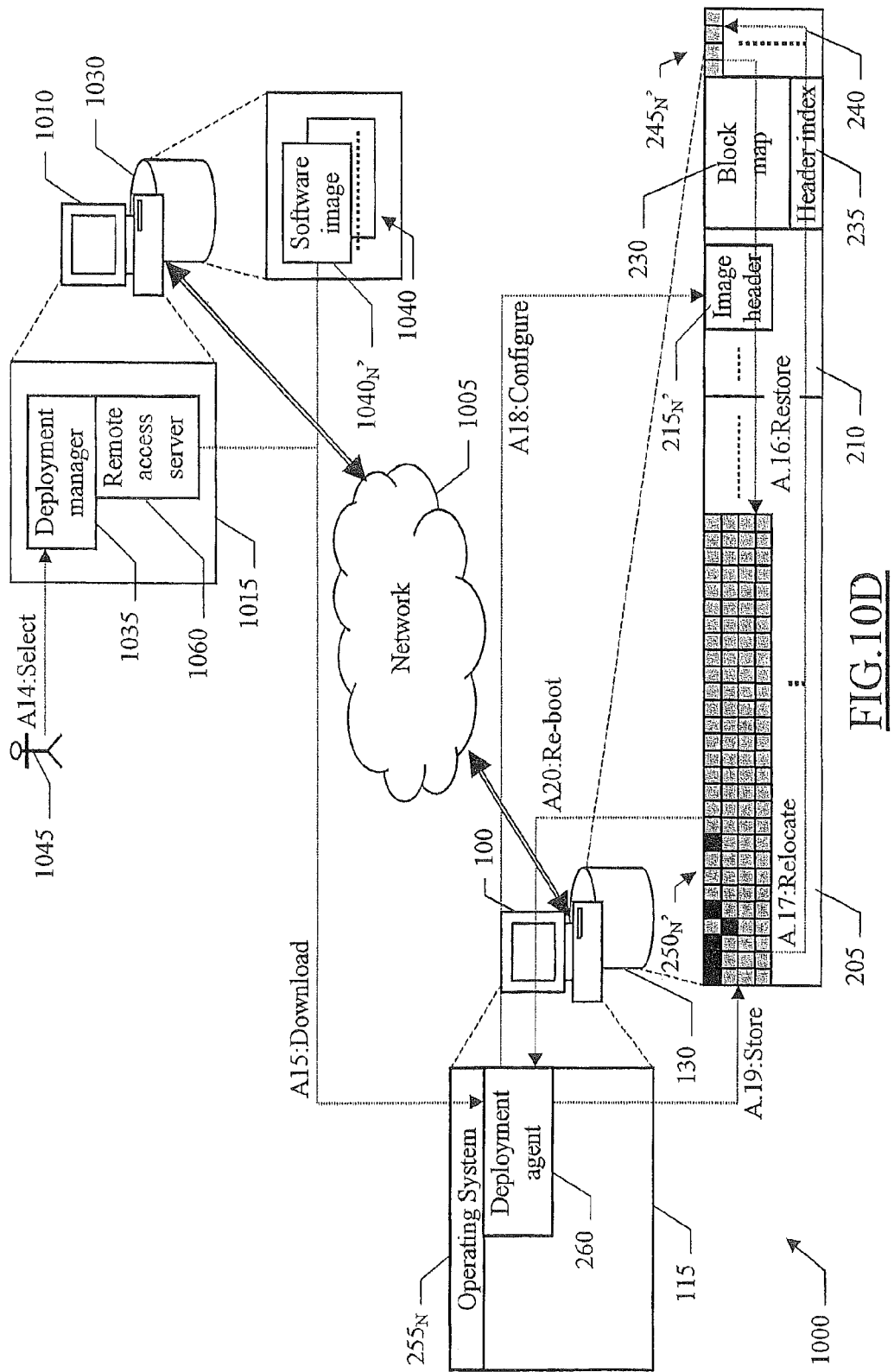

The same streaming technique may also be used (in connection with the above described operation of snapshot switching) to deploy other new software images 1040 onto the computer 100. For this purpose, as shown in FIG. 10D, the operator 1045 selects another new software image (denoted with the reference $1040_N'$ (action "A14:Select"). In response thereto, as above the deployment agent 260 downloads the boot blocks of the new software image $1040_N'$ from the server 1010 through the remote access server 1060 (action "A15:Download"). At this point, the deployment agent 260 restores the memory blocks from the relocated memory locations (if any) to the boot locations of the current software image, as indicated in its boot list (action "A16:Restore"). The deployment agent 260 then relocates the memory blocks stored in the boot locations of the new software image $1040_N'$ to the relocation portion 240 where they are denoted with the reference $245_N'$ (action "A17:Relocate"). The deployment agent 260 then creates a new image header for the new software image $1040_N$ (denoted with the reference $215_N'$) in the header portion 210, with an offset map including a number of block offsets corresponding to the size of the new software image $1040_N'$ and a boot list being set to the boot addresses of the new software image $1040_N'$ (action "A18:Configure"). The deployment agent 260 can now stores the boot blocks of the new software image $1040_N'$ into their boot locations (where they are shown in dark gray and denoted with the reference $250_N'$), at the same time updating the offset map of the image header $215_N'$ and the block map 230 accordingly (action "A19:Store"). At this point, the deployment agent 260 turns off and then turns on the computer 100, so as to boot it from its boot blocks $250_N'$, thereby loading (into the working memory 115) a portion of an operating system of the new software image $1040_N'$ corresponding to its boot blocks $250_N'$ and the deployment agent, which will serve every request of accessing any selected memory block of the new software image $1040_N'$ exactly as above (action "A20:Re-boot").

Figure 11:
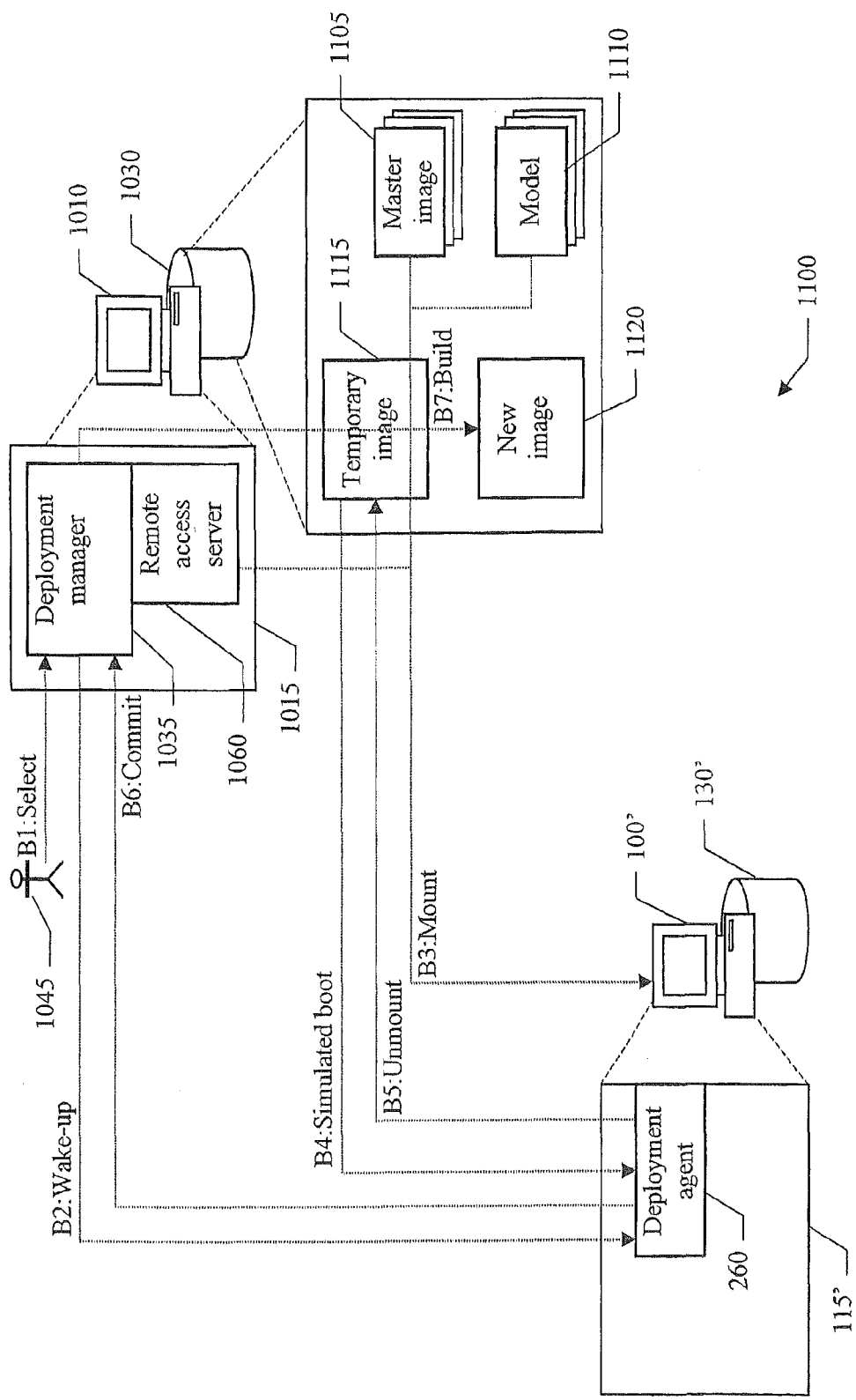
FIG. 11 shows a collaboration diagram representing the roles of the main software components that may be used to implement a preparation process according to an embodiment of the invention.

The above-described solution requires the knowledge of the boot blocks of every software image. For this purpose, for example, it is possible to prepare the software image accordingly. In this respect, reference is made to FIG. 11 showing a collaboration diagram representing the roles of the main software components (denoted as a whole with the reference 1100) that may be used to implement a preparation process of a generic software image to be used in the solution according to an embodiment of the invention.

For this purpose, the server 1010 includes a repository of master software images (or simply master images) 1105. Each master image 1105 provides a basic version of a corresponding software image (for example, created by capturing the content of a hard disk of a donor computer where it was previously installed), where specific contents relating to any configuration of the donor computer (for example, drivers and registry settings) have been removed. The server 1010 also includes a repository of models 1110 and each model 1110 includes contents specific for a corresponding configuration of the client computers where the software images have to be deployed.

The operator 1045 selects a software image (including a selected master image 1105 and a selected model 1110) for a specific type of computers (represented by a corresponding auxiliary computer 100' with its deployment agent 260) through the deployment manager 1035 (action "B1:Select"). In response thereto, the deployment manager 1035 wakes up the deployment agent 260 on the auxiliary computer 100' by passing an identifier of the selected software image (action "B2:Wake-up"). As a consequence, the deployment agent 260 mounts the selected software image as a remote disk (i.e., by acting as an iSCSI initiator in the example at issue) for accessing it remotely through the remote access server 1060. As a result, a temporary software image (or simply temporary image) 1115 for exclusive access by the auxiliary computer 100' is created. The temporary image 1115 is simply defined by an index structure pointing to the memory blocks of the selected master image 1105 and of the selected model 1110 (i.e., without making any copy thereof). The temporary image 1115 is mounted with a block tracing function enabled, so as to trace the image address of any memory block of the temporary image 1115 that is accessed (action "B3:Mount").

At this point, the deployment agent 260 simulates the boot sequence of the auxiliary computer 100' on the temporary image 1115 (up to the loading of the deployment agent). For example, in Microsoft Windows the deployment agent 260 reads the MBR, the boot sector, the bootmgr.exe file, the boot\bcd file, the system registry, the winload.exe file, the driver files specified in the system registry, and the deployment agent (action "B4:Simulated boot"). Once the simulated boot sequence has been completed, the deployment agent 260 unmounts the temporary image 1115 (action "B5:Unmount"). The deployment agent 260 then commits the temporary image 1115 to the deployment manger 1035 (action "B6:Commit"). In response thereto, the deployment manager 1035 builds a new software image (or simply new image) 1120 from the temporary image 1115 (simply defined by its index structure). Moreover, the new image 1120 is associated with the list of the memory blocks that have been accessed during the simulated boot procedure, which memory blocks define the corresponding boot blocks (action "B7:Build").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible (for example, with respect to numerical values and compositions). Particularly, different embodiments of the invention may even be practiced without the specific details set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

For example, similar considerations apply if the same solution is implemented with an equivalent method (by using similar steps with the same function of more steps or portions thereof, removing some steps being non-essential, or adding further optional steps); moreover, the steps may be performed in a different order, concurrently or in an interleaved way (at least in part).

Although the proposed technique has been specifically designed for use on physical computers, its application on virtual machines as well is not excluded. Moreover, the software images may include any software program (for example, only the operating system without any application programs and/or data). Likewise, the memory blocks may include any kind of information (for example, one or more sectors, files, libraries, directories, combinations or portions thereof, either relating to the operating system or the application programs).

Even though in the preceding description reference has been made to a computer where one or more software images are completely installed (so that no network connection is needed), the same technique may also be applied to software images that are only partially stored on the hard disk of the computer (with the deployment of a software image that re-starts when the computer is reverted to it).

The same technique may also be applied to any other operating system with whatever boot sequence. For example, in Linux® the boot blocks include (in addition to the deployment agent) the MBR including the grand unified bootloader (GRBU), and the /boot directory including the kernel and the initrd file system. In this case, during the boot sequence the BIOS loads the MBR including the GRBU, the GRBU finds the /boot directory and loads the kernel and the initrd file system, the GRBU boots on the kernel, the kernel starts the initrd file system, and the initrd file system starts the deployment agent.

In any case, the above-described access function may be implemented by whatever equivalent structure (even without any deployment agent).

The hard disk of the computer may be organized in a different way; for example, in an alternative implementation the memory blocks are relocated to free memory locations of the image portion (without the need of any dedicated relocation portion). Moreover, any other control structure may be used to associate each memory block of the software images with the corresponding memory location where it is stored. For example, for each software image the offset map may directly include the memory address of the memory location storing each memory block (or any other indication thereof), the boot blocks as well may be identified in the offset map (for example, by means of a corresponding flag), and the like. Alternatively, when a memory block is relocated, it is possible to associate this memory block with the memory address of the corresponding relocated memory location in the offset map of each software image using it. In this way, the offset maps always directly provide the memory address of the actual memory location (in the image portion or in the relocation portion) where each memory block is stored.

Any other default value may be associated with the memory blocks that are not used; however, the possibility of associated the memory blocks of all the software images that are not used with a common pre-defined memory location is not excluded (with all the memory blocks that are then read exactly in the same way).

In this case, it is possible to simplify the write operation as well (i.e., by simply discriminating the situations where the memory location storing the memory block to be written is only used by the current software image or it is shared with other software images).

The block map may be replaced with any equivalent structure (with the write operation that is updated accordingly). For example, nothing prevents providing a bit map storing a flag indicative of the availability of each memory location, and then the block counters of the used memory locations only (always higher than zero). In addition or alternatively, it is also possible to store an indication of the software images using the memory block stored in each memory location.

Similar considerations apply to the other operations described above (i.e., the snapshot creation operation, the snapshot deletion operation, the snapshot switching operation, the snapshot export operation, and the snapshot import operation). Naturally, these operations are not to be interpreted in a limitative manner, with the same solution described above that may also support only some of them, and/or additional operations (for example, the management of snapshots of the operating system only).

The step of restoring the relocated memory blocks when the computer is switched to another software image is not strictly necessary. For example, it is also possible to maintain the boot blocks of all the software images always stored in the corresponding boot locations, and then maintain always relocated the corresponding memory blocks (thereby making the switching operation faster, but at the cost of a waste of hard disk space).

The software images may be deployed with the above-described streaming technique from any external source (for example, a removable storage device). Alternatively, it is also possible to maintain the streaming process always active, even after the software image has been completely deployed (for example, for downloading up-to-date versions of the memory blocks in response to a reset of the corresponding block offsets to the null value). Similar considerations apply if the workload is monitored with any other frequency or only during specific periods (for example, at night), only for the computer, the server, the network, or any combination thereof, or if two or more memory blocks are downloaded at the same time when the workload falls below the threshold value (with this feature that may be omitted when the streaming process remains always active). In any case, the proposed technique is completely independent of how the software images have been deployed onto the client computer (for example, even manually without any server computer). The software images may also be prepared in a different way (for example, by actually booting the auxiliary computer and tracing the memory blocks that are accessed during the booting sequence to identify its boot blocks).

Similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media). The program may take any form suitable to be used by any data-processing system or in connection therewith (for example, within a virtual machine). Particularly, the program may be in the form of external or resident software, firmware, or microcode (either in object code or in source code, for example, to be compiled or interpreted). Moreover, it is possible to provide the program as an article of manufacture implemented on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed on otherwise configured.

Alternatively, the system has a different structure or includes equivalent components, or it has other operative characteristics. In any case, every component thereof may be separated into more elements, or two or more components may be combined together into a single element; moreover, each component may be replicated to support the execution of the corresponding operations in parallel. It is also pointed out that any interaction between different components generally does not need to be continuous (unless specified otherwise), and it may be either direct or indirect through one or more intermediaries. Particularly, the system may be based on a different architecture (for example, a wide area, global, cellular or satellite network), and exploiting any type of (wired and/or wireless) connections. In any case, each computer may have another structure or may include similar elements (such as cache memories temporarily storing the programs or parts thereof); moreover, it is possible to replace the computer with any data-processing entity (such as a personal digital assistant or "PDA", a mobile phone, and the like), or with a combination of multiple entities.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for managing multiple software images on a data processing entity that includes a mass memory with a plurality of memory locations, each of the memory locations having a corresponding memory address within the mass memory, each of the software images including a plurality of memory blocks, each of the memory blocks having a corresponding image address within the software image, comprising:
    storing a single version of each memory block of at least a subset of all of the software images into a corresponding memory location;
    providing a control structure that associates each memory block with the memory location storing the single version of the memory block;
    relocating the memory blocks stored in boot locations of a current software image, the boot locations of each software image being the memory locations having the memory addresses equal to the image addresses of boot blocks of the software image including the memory blocks required to boot the data processing entity up to load an access function adapted to access the memory blocks of the software image;
    storing the boot blocks of the current software image into the corresponding boot locations;
    booting the data-processing entity from the boot blocks of the current software image in the corresponding boot locations thereby loading the access function; and
    serving, by the access function, each request to access a selected memory block of the current software image, the access function accessing the selected memory block in the associated memory location provided by the control structure.

2. The method according to claim 1, wherein the mass memory includes an image portion for storing non-relocated memory blocks and a relocation portion for storing the relocated memory blocks, and wherein for each software image the control structure includes an offset map providing an indication of the memory address of the memory location in the image portion storing each non-relocated memory block, and a boot list providing an indication of the image addresses of the corresponding boot blocks.

3. The method according to claim 1, wherein accessing the selected memory block includes reading the selected memory block from the mass memory by one of:
    returning a default value responsive to the selected memory block not being stored in the mass memory, and
    returning the selected memory block being retrieved from the associated memory location provided by the control structure responsive to the selected memory block being stored in the mass memory.

4. The method according to claim 1, wherein accessing the selected memory block includes writing the selected memory block onto the mass memory by one of:
    storing the selected memory block into a free memory location and associating the selected memory block with the free memory location in the control structure when the selected memory block is not stored in mass memory,
    storing the selected memory block into the associated memory location provided by the control structure when the memory block stored in the associated memory location is used by the current software image only, and
    storing the selected memory block into a free memory location and associating the selected memory block with the free memory location in the control structure when the memory block stored in the associated memory location is shared with at least another software image.

5. The method according to claim 4, wherein the control structure includes a block map providing a block counter for each memory location indicative of a number of software images sharing the memory block stored in the memory location, the writing the selected memory block further including one of:
  setting the block counter of the free memory location to one when the selected memory block is not stored in the mass memory, and
  decreasing the block counter of the associated memory location and setting the block counter of the free memory location to one when the memory block stored in the associated memory location is shared with at least another software image.

6. The method according to claim 5, further including, in response to a request to create a target software image from a source software image:
  associating the memory location storing each memory block of the source software image with a corresponding memory block of the target software image in the control structure.

7. The method according to claim 6, wherein the associating includes:
  increasing the block counter of the memory location storing each memory block of the source software image by one.

8. The method according to claim 5, further including, in response to a request to delete an obsolete software image:
  removing the association of each memory block of the obsolete software image with the memory location storing the memory block of the obsolete software image in the control structure.

9. The method according to claim 8, wherein removing the association includes:
  decreasing the block counter of the memory location storing each memory block of the obsolete software image by one.

10. The method according to claim 1, further including, in response to a request to switch to the current software image from a previous software image:
  restoring the memory blocks being relocated from the boot locations of the previous software image into the boot locations of the previous software image before relocating the memory blocks stored in the boot locations of the current software image.

11. The method according to claim 1, further including, in response to a request to export a selected software image onto an external device:
  reading each memory block of the selected software image, the reading including one of setting the memory block to a further default when the memory block of the selected software image is not stored in a memory location and retrieving the memory block of the selected software image from the associated memory location provided by the control structure otherwise, and
  copying each memory block of the selected software image onto the external device.

12. The method according to claim 1, further including, in response to a request to import an external software image from a further external device:
  retrieving each memory block of the external software image from the further external device, and
  writing each memory block of the external software image by storing the memory block of the external software image into a further free memory location and associating the memory block of the external software image with the further free memory location in the control structure.

13. The method according to claim 1, further including:
  requesting a deployment of a new software image from an external source onto the data-processing entity,
  downloading the boot blocks of the new software image from the external source onto the data-processing entity,
  relocating the memory blocks stored in the boot locations of the new software image,
  storing the boot blocks of the new software image into the corresponding boot locations,
  booting the data-processing entity from the boot blocks of the new software image in the corresponding boot locations thereby loading a streaming function adapted to deploy the new software image, and
  serving each request of reading a further selected memory block of the new software image by the streaming function, the streaming function downloading the further selected memory block from the external source, storing the further selected memory block into a still further free memory location, and performing one of:
    associating the further selected memory block with the still further free memory location in the control structure when the further selected memory block is not stored in a memory location, and
    reading the further selected memory block from the associated memory location provided by the control structure otherwise.

14. A computer program product comprising:
  a computer readable storage medium having computer readable program code embodied therewith, the computer readable program code comprising:
  computer readable program code configured for:
  managing multiple software images on a data processing entity that includes a mass memory with a plurality of memory locations, each of the memory locations having a corresponding memory address within the mass memory, each of the software images including a plurality of memory blocks, each of the memory blocks having a corresponding image address within the software image, wherein the managing includes:
  storing a single version of each memory block of at least a subset of all of the software images into a corresponding memory location,
  providing a control structure that associates each memory block with the memory location storing the single version of the memory block,
  relocating the memory blocks stored in boot locations of a current software image, the boot locations of each software image being the memory locations having the memory addresses equal to the image addresses of boot blocks of the software image including the memory blocks required to boot the data processing entity up to load an access function adapted to access the memory blocks of the software image,
  storing the boot blocks of the current software image into the corresponding boot locations,
  booting the data-processing entity from the boot blocks of the current software image in the corresponding boot locations thereby loading the access function, and
  serving, by the access function, each request to access a selected memory block of the current software image by the access function, the access function accessing the selected memory block in the associated memory location provided by the control structure.

15. The computer program product of claim 14, wherein the mass memory includes an image portion for storing non-relocated memory blocks and a relocation portion for storing the relocated memory blocks, and wherein for each software image the control structure includes an offset map providing an indication of the memory address of the memory location in the image portion storing each non-relocated memory block, and a boot list providing an indication of the image addresses of the corresponding boot blocks.

16. The computer program product of claim 14, wherein accessing the selected memory block includes reading the selected memory block from the mass memory by one of:
   returning a default value responsive to the selected memory block not being stored in the mass memory, and
   returning the selected memory block being retrieved from the associated memory location provided by the control structure responsive to the selected memory block being stored in the mass memory.

17. The computer program product of claim 14, wherein accessing the selected memory block includes writing the selected memory block onto the mass memory by one of:
   storing the selected memory block into a free memory location and associating the selected memory block with the free memory location in the control structure when the selected memory block is not stored in mass memory,
   storing the selected memory block into the associated memory location provided by the control structure when the memory block stored in the associated memory location is used by the current software image only, and
   storing the selected memory block into a free memory location and associating the selected memory block with the free memory location in the control structure when the memory block stored in the associated memory location is shared with at least another software image.

18. The computer program product of claim 14, wherein the computer readable program code is further configured for:
   requesting a deployment of a new software image from an external source onto the data-processing entity,
   downloading the boot blocks of the new software image from the external source onto the data-processing entity,
   relocating the memory blocks stored in the boot locations of the new software image,
   storing the boot blocks of the new software image into the corresponding boot locations,
   booting the data-processing entity from the boot blocks of the new software image in the corresponding boot locations thereby loading a streaming function adapted to deploy the new software image, and
   serving each request of reading a further selected memory block of the new software image by the streaming function, the streaming function downloading the further selected memory block from the external source, storing the further selected memory block into a still further free memory location, and performing one of:
      associating the further selected memory block with the still further free memory location in the control structure when the further selected memory block is not stored in a memory location, and
      reading the further selected memory block from the associated memory location provided by the control structure otherwise.

19. A computer system comprising:
a processor configured for:
managing multiple software images on a data processing entity that includes a mass memory with a plurality of memory locations, each of the memory locations having a corresponding memory address within the mass memory, each of the software images including a plurality of memory blocks, each of the memory blocks having a corresponding image address within the software image, wherein the managing includes:
storing a single version of each memory block of at least a subset of all of the software images into a corresponding memory location,
providing a control structure that associates each memory block with the memory location storing the single version of the memory block,
relocating the memory blocks stored in boot locations of a current software image, the boot locations of each software image being the memory locations having the memory addresses equal to the image addresses of boot blocks of the software image including the memory blocks required to boot the data processing entity up to load an access function adapted to access the memory blocks of the software image,
storing the boot blocks of the current software image into the corresponding boot locations,
booting the data-processing entity from the boot blocks of the current software image in the corresponding boot locations thereby loading the access function, and
serving, by the access function, each request to accessing a selected memory block of the current software image, the access function accessing the selected memory block in the associated memory location provided by the control structure.

20. The system of claim 19, wherein the mass memory includes an image portion for storing non-relocated memory blocks and a relocation portion for storing the relocated memory blocks, and wherein for each software image the control structure includes an offset map providing an indication of the memory address of the memory location in the image portion storing each non-relocated memory block, and a boot list providing an indication of the image addresses of the corresponding boot blocks.

* * * * *